United States Patent
Stover et al.

(10) Patent No.: US 12,442,965 B2
(45) Date of Patent: Oct. 14, 2025

(54) OPTICAL FILM

(71) Applicant: 3M INNOVATIVE PROPERTIES COMPANY, St. Paul, MN (US)

(72) Inventors: Carl A. Stover, St. Paul, MN (US); Lin Zhao, Woodbury, MN (US); Gilles J. Benoit, Minneapolis, MN (US); Robert D. Taylor, Stacy, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 456 days.

(21) Appl. No.: 17/996,695

(22) PCT Filed: May 3, 2021

(86) PCT No.: PCT/IB2021/053687
§ 371 (c)(1),
(2) Date: Oct. 20, 2022

(87) PCT Pub. No.: WO2021/224760
PCT Pub. Date: Nov. 11, 2021

(65) Prior Publication Data
US 2023/0273359 A1 Aug. 31, 2023

Related U.S. Application Data

(60) Provisional application No. 62/704,400, filed on May 8, 2020.

(51) Int. Cl.
*G02B 5/30* (2006.01)
(52) U.S. Cl.
CPC .................. *G02B 5/305* (2013.01)

(58) Field of Classification Search
CPC ........................ G02B 5/0841; G02B 5/3041
See application file for complete search history.

(56) References Cited

U.S. PATENT DOCUMENTS 5,882,774 A    3/1999   Jonza et al.
6,179,948 B1   1/2001   Merrill et al.
(Continued)

FOREIGN PATENT DOCUMENTS

JP    2012230361 A    11/2012
JP    2018509653 A    4/2018
(Continued)

OTHER PUBLICATIONS

International Search Report for PCT International Application No. PCT/IB2021/053687, mailed on Jul. 27, 2021, 5 pages.

*Primary Examiner* — James A Dudek
(74) *Attorney, Agent, or Firm* — Clifton F. Richardson

(57) ABSTRACT

An optical film includes a plurality of polymeric layers arranged along at least a portion of a thickness of the optical film. Each polymeric layer has an average thickness less than about 300 nm. The plurality of polymeric layers includes a first polymeric layer having a largest average thickness among the plurality of polymeric layers, and a second polymeric layer disposed between a third polymeric layer and the first polymeric layer. The first and second polymeric layers are separated by N1 polymeric layers where 2≤N1≤10. The second and third polymeric layers are separated by N2 polymeric layers where N2≥10. The first, second and third polymeric layers have respective average thicknesses t1, t2 and t3, where t1 is greater than t2 by at least 10%, and t2 is greater than t3 by at most 2%.

15 Claims, 19 Drawing Sheets

(56) References Cited

U.S. PATENT DOCUMENTS

| | | |
|---|---|---|
| 6,783,349 B2 | 8/2004 | Neavin et al. |
| 6,967,778 B1 | 11/2005 | Wheatley et al. |
| 8,773,620 B2 | 7/2014 | Banerjee |
| 9,162,406 B2 | 10/2015 | Neavin et al. |
| 9,441,809 B2 | 9/2016 | Nevitt et al. |
| 9,551,818 B2 | 1/2017 | Weber et al. |
| 2005/0264874 A1* | 12/2005 | Lin ........................ B82Y 20/00 359/359 |
| 2014/0240829 A1 | 8/2014 | Weber et al. |

FOREIGN PATENT DOCUMENTS

| | | |
|---|---|---|
| JP | 2020510239 A | 4/2020 |
| WO | 1999036809 A1 | 7/1999 |
| WO | 2013059228 A1 | 4/2013 |
| WO | 2013059231 A1 | 4/2013 |
| WO | 2016137777 A1 | 9/2016 |
| WO | 2018163009 A1 | 9/2018 |
| WO | 2019009316 A1 | 1/2019 |

\* cited by examiner

OPTICAL FILM

CROSS REFERENCE TO RELATED APPLICATIONS

This application is a national stage filing under 35 U.S.C. 371 of PCT/IB2021/053687, filed May 3, 2021, which claims the benefit of U.S. Application No. 62/704,400, filed May 8, 2020, the disclosures of which are incorporated by reference in their entirety herein.

BACKGROUND

Optical films, such as reflective polarizer films and mirror films, can include alternating polymeric layers.

SUMMARY

The present disclosure is generally related to optical films. An optical film can include a plurality of polymeric layers. The optical film can be a reflective polarizer or a mirror film, for example.

In some aspect of the present description, an optical film including a plurality of polymeric layers arranged along at least a portion of a thickness of the optical film is provided. Each polymeric layer can have an average thickness less than about 300 nm. The plurality of polymeric layers includes a first polymeric layer having a largest average thickness among the plurality of polymeric layers, and a second polymeric layer disposed between a third polymeric layer and the first polymeric layer. The first and second polymeric layers are separated by N1 polymeric layers where 2≤N1≤10. The second and third polymeric layers are separated by N2 polymeric layers where N2≥10. The first, second and third polymeric layers have respective average thicknesses t1, t2 and t3, where t1 is greater than t2 by at least 10% and t2 is greater than t3 by at most 2%.

In some aspect of the present description, an optical film is provided. The optical film includes a plurality of polymeric layers arranged along at least a portion of a thickness of the optical film and sequentially numbered from 1 to N, where N is an integer between 50 and 800. Each polymeric layer can have an average thickness less than about 300 nm. A plot of an average layer thickness versus a layer number includes a knee region separating a left region where the polymeric layers have lower layer numbers and the average thickness increases with increasing layer number at a smaller rate, from a right region where the polymeric layers have higher layer numbers and the average thickness increases with increasing layer number at a greater rate, such that the plurality of polymeric layers includes a first polymeric layer in the right region having an average thickness t1', a second polymeric layer in the knee region having an average thickness t2', and a third polymeric layer in the left region having an average thickness t3'. The first polymeric layer is separated from the second polymeric layer by M1 polymeric layers where 2≤M1≤10. The third polymeric layer is separated from the second polymeric layer by M2 polymeric layers where M2≥10. t1' is greater than t2' by at least 10% and t2' is greater than t3' by at most 2%.

In some aspect of the present description, an optical film including a plurality of first polymeric layers arranged sequentially adjacent to each other along a first portion of a thickness of the optical film and a plurality of second polymeric layers arranged sequentially adjacent to each other along a second portion of the thickness of the optical film is provided. Each first and second polymeric layer can have an average thickness less than about 300 nm. A thickest first polymeric layer is the first polymeric layer closest to the second portion. A thinnest second polymeric layer is the second polymeric layer closest to the first portion. The first polymeric layers number at least 10 in total and the second polymeric layers number between 5 and 30 in total. The average thickness of the first polymeric layers increase substantially linearly from the thinnest to the thickest first polymeric layers at a rate of less than about 0.25 nm per layer. The thickest second polymeric layer is thicker than the thinnest second polymeric layer by at least 10%. For substantially normally incident light having a first polarization state, an optical transmittance of the optical film has a band edge between about 850 nm and about 950 nm, such that a best linear fit to the band edge correlating the optical transmittance to wavelength at least across a wavelength range where the optical transmittance increases from about 10% to about 70% has a slope that is less than about 4%/nm.

In some aspect of the present description, an infrared transmissive reflective polarizer is provided. The reflective polarizer includes a plurality of polymeric layers arranged along at least a first thickness portion of the reflective polarizer and sequentially numbered from 1 to N where N is an integer between 50 and 800. Each layer of the reflective polarizer in the first thickness portion can have an average thickness less than about 300 nm. A plot of an average layer thickness versus a layer number having a profile causing the plurality of polymeric layers to: reflect greater than about 80% of a substantially normally incident light having a first polarization state in a first wavelength range extending from about 400 nm to about 800 nm; transmit greater than about 40% of the incident light having a second polarization state, orthogonal to the first polarization state, in the first wavelength range; transmit greater than about 89.5% of the incident light in a second wavelength range extending from about 950 nm to about 1300 nm for each of the first and second polarization states; and have an optical transmittance band edge between about 850 nm and about 950 nm for the incident light having the first polarization state, such that a best linear fit to the band edge correlating the optical transmittance to wavelength at least across a wavelength range where the optical transmittance increases from about 10% to about 70% has a slope that is less than about 4%/nm.

In some aspect of the present description, an optical film is provided. The optical film includes a plurality of polymeric layers arranged along at least a portion of a thickness of the optical film and sequentially numbered from 1 to N where N is an integer greater than about 100. The plurality of polymeric layers includes polymeric end layer at each end thereof. The polymeric end layers and each of the polymeric layers therebetween can have an average thickness less than about 300 nm. An mth layer in the plurality of the polymeric layers has an average thickness tm, where m<N, such that an average thickness of each polymeric layer in the plurality of polymeric layers having a layer number n, m≤n≤N, is within about 10% of $$tm + A\, e^{\frac{-(N-n)}{d}},$$

where A is a real number, 0.01 tm≤A≤0.25 tm, and d is an integer, 0.005N≤d≤0.1N. For substantially normally incident light having a first polarization state, an optical transmittance of the optical film comprises a band edge between about 600 nm and about 950 nm, such that a best linear fit to the band edge correlating the optical transmittance to wavelength at least across a wavelength range where the optical transmittance increases from about 10% to about 70% has a slope that is less than about 4%/nm.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, an optical film includes alternating polymeric layers where a thickness profile (thickness versus layer number) of the polymeric layers is chosen to provide a desired band edge slope. For example, the polymeric layers can generally increases in thickness from a first side to a second side of a stack of the polymeric layers and the thickness profile can be selected to lower a slope of a band edge (e.g., between a visible light wavelength range where the optical film is reflective and an infrared wavelength range where the optical film is transmissive) by including a rapid increase in layer thickness near the second side of the stack of polymeric layers. The optical film can be a reflective polarizer or a mirror film, for example.

Figure 1:
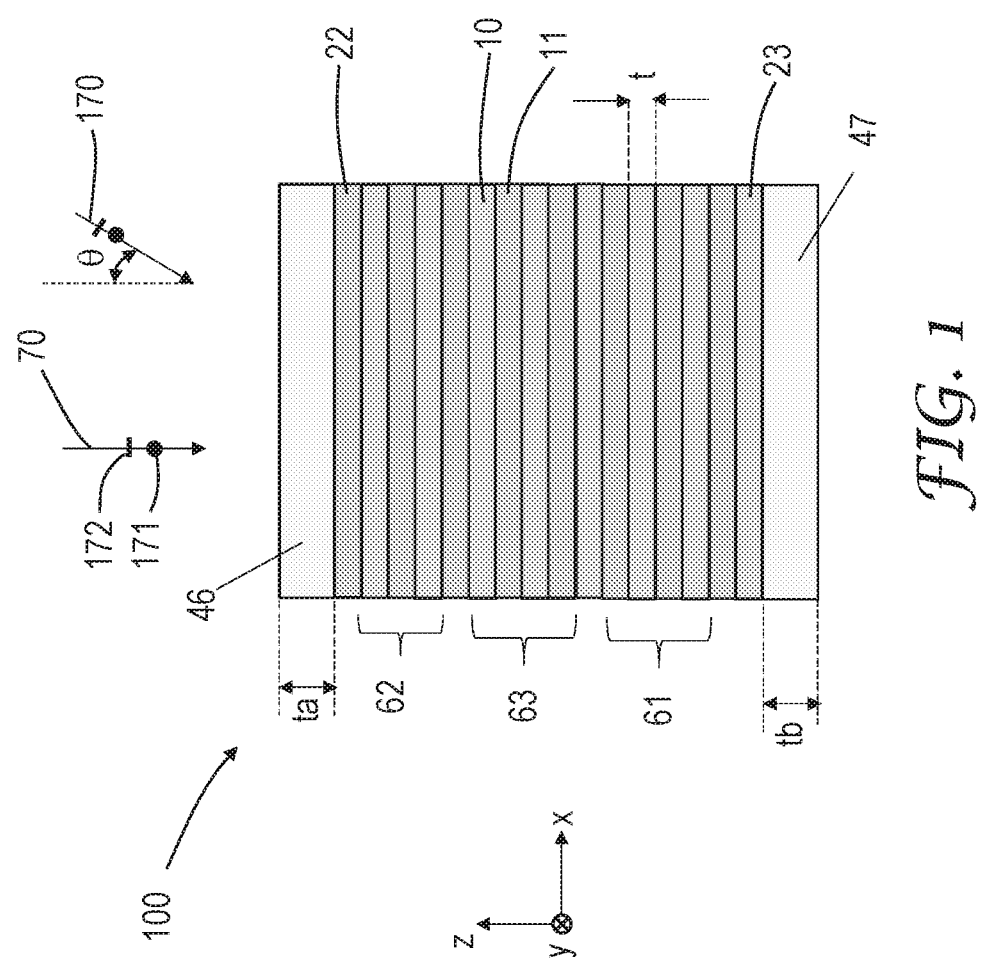
FIGS. 1-2 are schematic cross-sectional views of illustrative optical films.
Figure 2:
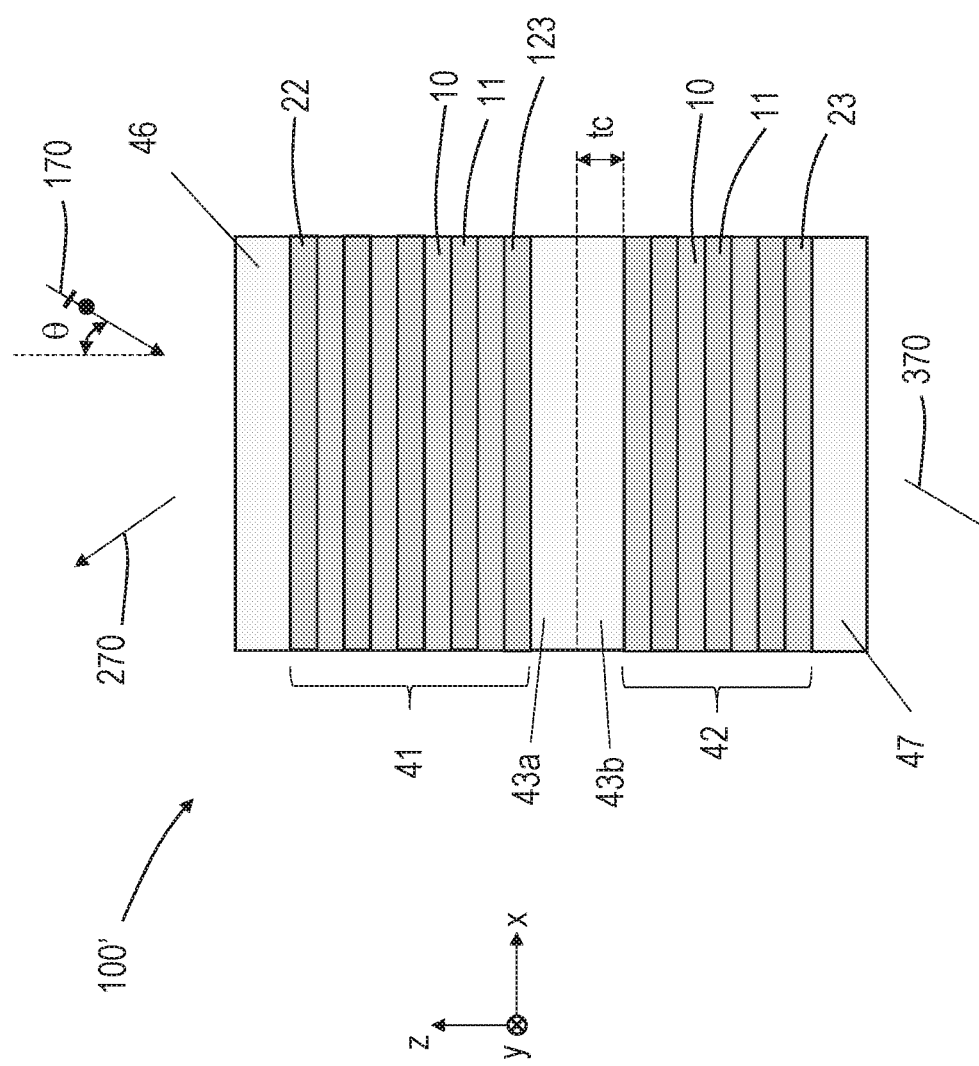

FIGS. 1-2 are schematic cross-sectional views of optical films 100 and 100', according to some embodiments. The optical film 100, 100' includes a plurality of polymeric layers 10, 11 arranged along at least a portion of a thickness (along the z-direction, referring to the illustrated x-y-z coordinate system) of the optical film. Each polymeric layer 10, 11 has an average thickness t which may be less than about 300 nm.

The polymeric layers include a plurality of polymeric layers arranged sequentially adjacent to each other along a first portion 61 of a thickness of the optical film 100 and a plurality of polymeric layers arranged sequentially adjacent to each other along a second portion 62 of the thickness of the optical film. In some embodiments, the polymeric layers include a plurality of polymeric layers arranged sequentially adjacent to each other along a third portion 63 of the thickness of the optical film where the third portion is disposed between the first and second portions 61 and 62.

The optical films 100, 100' include outermost layers 46 and 47 which have thicknesses ta and tb, respectively. Each thickness ta, tb can be greater than about 500 nm, or greater than about 1 micrometer, or greater than about 2 micrometers, or greater than about 3 micrometers, or greater than about 5 micrometers, for example. The thicknesses of the outermost layers 46 and 47 may have an effect on the transmission spectra of the optical film due to light reflected from surfaces of the layers 46 and 47 which may undergo optical interference with light reflected from other layers. For the optical film 100', the plurality of polymeric layers 10, 11 includes first (41) and second (42) pluralities of polymeric layers where the first and second pluralities of polymeric layers are separated from one another along the thickness of the optical film by at least one middle layer 43a, 43b, where each middle layer 43a, 43b has an average thickness tc greater than about 500 nm, or greater than about 1 micrometer, or greater than about 2 micrometers, or greater than about 3 micrometers, or greater than about 5 micrometers, for example. The at least one middle layer 43a, 43b can be two protective boundary layers, or a single layer formed from two protective boundary layers, for example. As is known in the art, protective boundary layers are often included adjacent to packets of alternating interference layers to protect the interference layers from damage during processing. Outermost layer 46 and/or 47 can be a protective boundary layer or a combination of a protective boundary layer with an additional outer skin layer, for example.

The number of polymeric layers 10, 11 in the optical film 100, 100' and/or in any one or more of the portions 61, 62 and 63 and/or in the first and second pluralities of layers 41 and 42 can be substantially larger than schematically illustrated in FIGS. 1-2. For example, the plurality of polymeric layers 10, 11 can include 50 to 800 layers in total. In some embodiments, the plurality of polymeric layers 10, 11 includes at least 100 layers.

The plurality of polymeric layers 10, 11 can include alternating first and second polymeric layers 10 and 11 which may be referred to as interference layers. Interference layers may be described as reflecting and transmitting light primarily by optical interference when the reflectance and transmittance of the interference layers can be reasonably described by optical interference or reasonably accurately modeled as resulting from optical interference. As is known in the art, multilayer optical films including alternating polymeric layers can be used to provide desired reflection and transmission in desired wavelength ranges by suitable selection of layer thicknesses. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example.

As described further elsewhere herein, the transmittance and reflectance of the optical film 100, 100' may be specified for substantially normally incident (e.g., within 30 degrees, or 20 degrees, or 10 degrees of normally incident) light 70 and/or for light 170 having an incident angle θ (angle of incidence direction with the normal to the optical film) and may be specified for first and/or second polarization states (e.g., first and second polarization states 171 and 172). The electric field is polarized along the y-axis for first polarization state 171 and is polarized in the x-z plane for second polarization state 172 in the illustrated embodiment. In some embodiments, the optical film 100, 100' is a reflective polarizer. A pass (resp., block) polarization state of a reflective polarizer can be a p-polarization state (p-pol) or an s-polarization state (s-pol) with the projection of the electric field onto a plane (x-y plane) of the reflective polarizer being parallel to a pass (resp., block) axis of the reflective polarizer. In some embodiments, the first polarization state 171 is a block state of the reflective polarizer and the second polarization state 172 is a pass state of the reflective polarizer regardless of the plane of incidence. A portion (e.g., light 270) of the incident light 70, 170 is typically reflected and a portion (e.g., light 370) is typically transmitted. In some embodiments, for the second polarization state 172 (and/or for a pass polarization state) and a first wavelength range, the reflective polarizer has a greater average optical transmittance for light incident at a smaller incident angle (e.g., light 70) and a smaller average optical transmittance for light incident at a greater incident angle (e.g., light 170). Such reflective polarizers may be referred to as collimating reflective polarizers since when the reflective polarizer is included in a recycling backlight, a portion of light in the pass polarization state that is incident at oblique angles is reflected by the reflective polarizer and then recycled and is eventually transmitted when incident on the reflective polarizer at a smaller incident angle. Collimating reflective polarizers are known in the art and are described in U.S. Pat. No. 9,441,809 (Nevitt et al.) and U.S. Pat. No. 9,551,818 (Weber et al.), for example. In other embodiments, the optical film 100, 100' is a mirror film substantially reflecting (e.g., average reflectance of at least about 60%, or at least about 70%, or at least about 80%) substantially normally incident light 70 in a visible wavelength range (e.g., 400 nm to 700 nm) for each of the first and second polarization states 171 and 172.

In some embodiments, the optical film has a layer thickness profile selected to give a desired transition between reflection and pass bands, for example. Optical films having sharp band edges are known in the art and are described in U.S. Pat. No. 6,967,778 (Wheatley et al.), for example. In some embodiments, it is desired for the band edge to have relatively low slope as this can provide reduced color shift with viewing angle as the band edge shifts into the visible at larger viewing angles. In some embodiments, for a substantially white light (e.g., light 70, 170 can be substantially white) incident on the optical film and having the first polarization state 171, a reflected portion (e.g., light 270) of the incident light has a maximum color shift Δ as an incidence angle of the incident light varies from zero to 60 degrees of less than about 0.02, or less than about 0.015, or less than about 0.012 (see, e.g., FIG. 19). Similarly, in some embodiments, for a substantially white light incident on the optical film and having the second polarization state 172, a reflected portion of the incident light has a maximum color shift Δ as an incidence angle of the incident light varies from zero to 60 degrees of less than about 0.02, or less than about 0.015, or less than about 0.012. The maximum color shift Δ is a Euclidean distance on a CIE (Commission internationale de l'éclairage) 1931 chromaticity diagram. Substantially white light can have CIE x and y coordinates each within about 0.02, or within about 0.01, or within about 0.005 of ⅓.

In some embodiments, the optical film 100 or 100' is an infrared transmissive optical film such as an infrared transmissive reflective polarizer or an infrared transmissive mirror film. For example, the reflective polarizer or mirror film may transmit greater than about 60% (or greater than about 70%, or greater than about 75%, or greater than about 80%) of the substantially normally incident light 70 in the wavelength range from about 950 nm to about 1200 nm or from about 950 nm to about 1300 nm for each of the orthogonal first and second polarization states 171 and 172.

Figure 3:
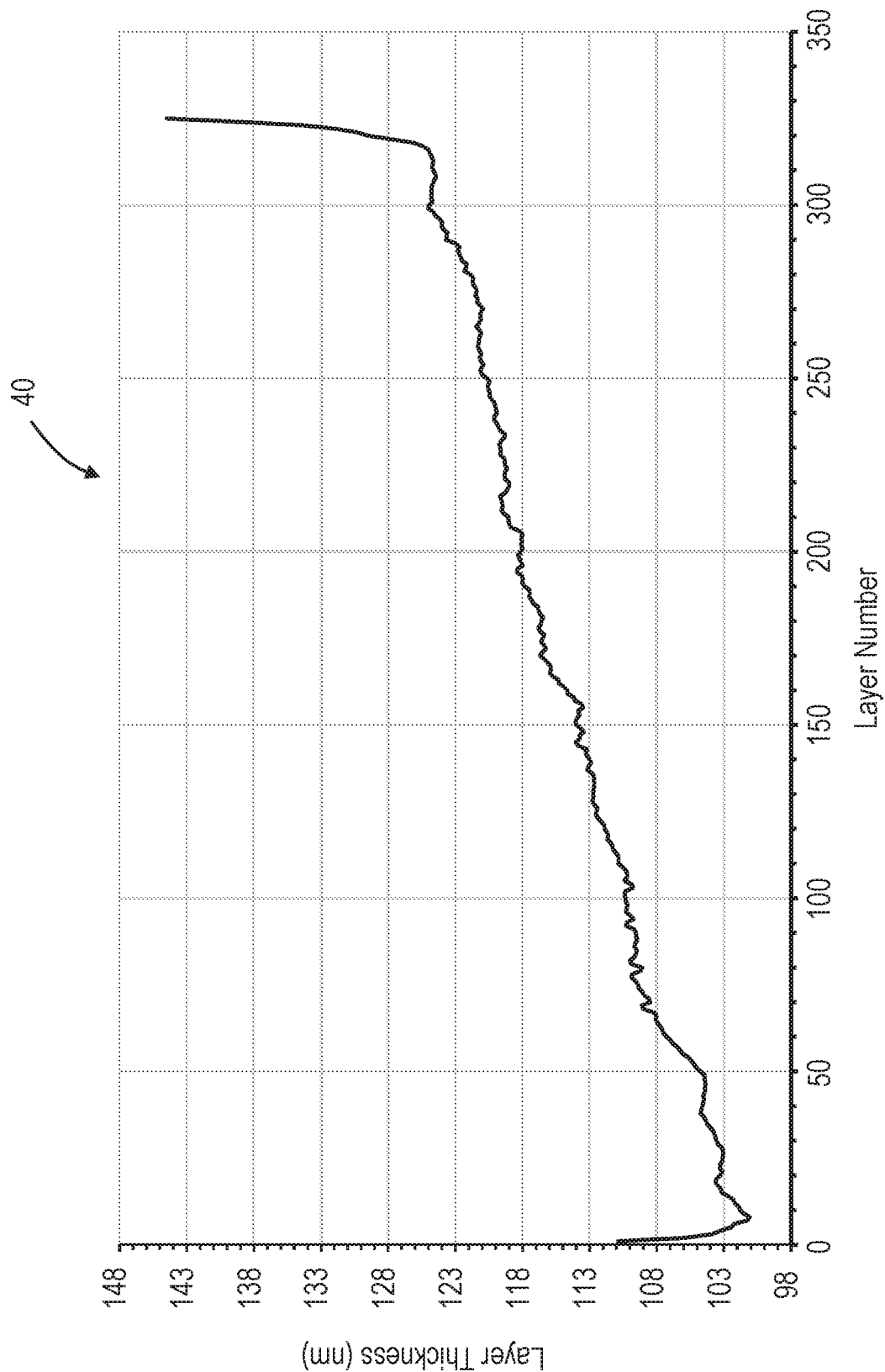
FIG. 3 is an illustrative plot of average layer thickness versus layer number for a plurality of polymeric layers.
Figure 4:
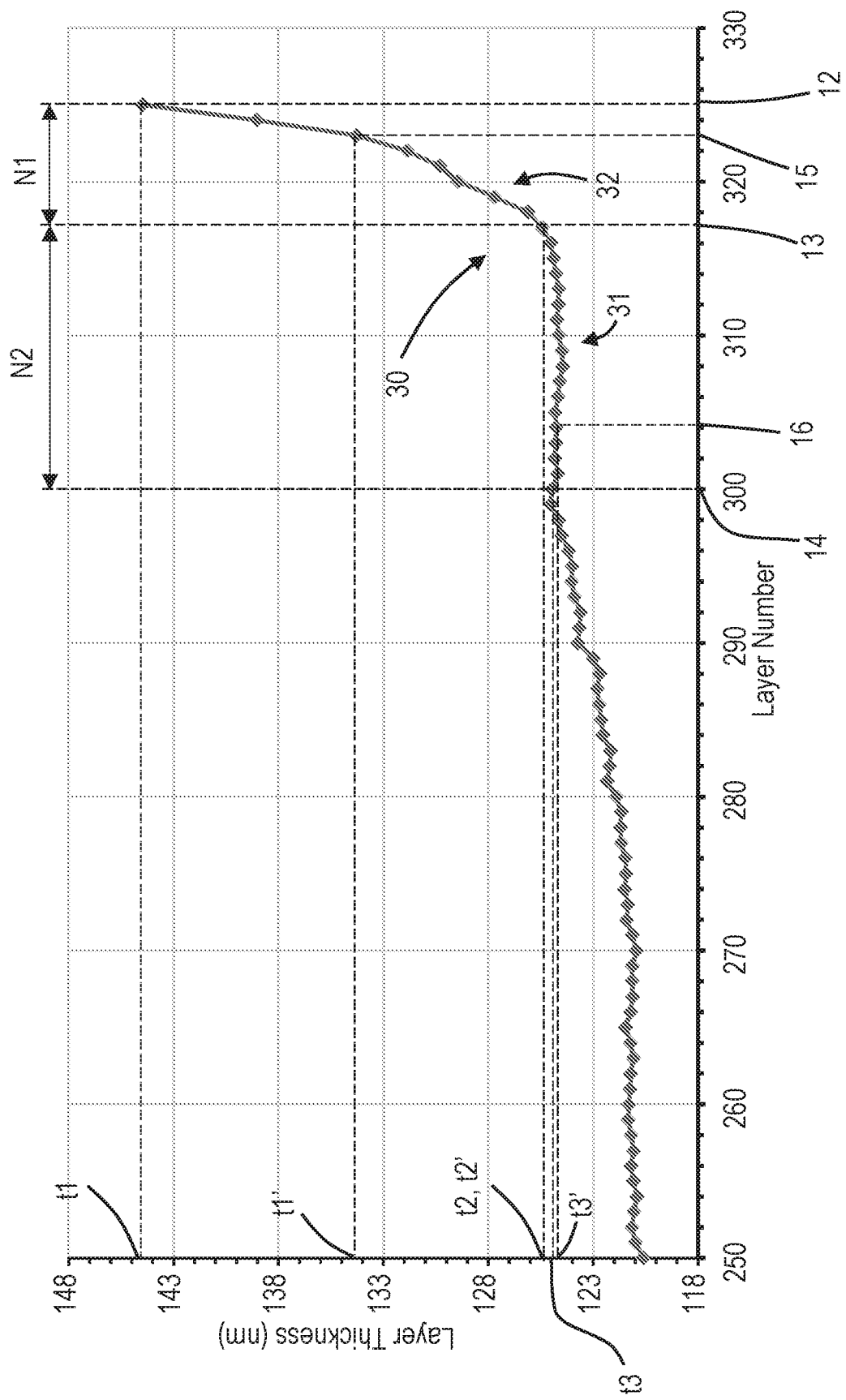
FIGS. 4-6 show portions of the plot of FIG. 3.
Figure 5:
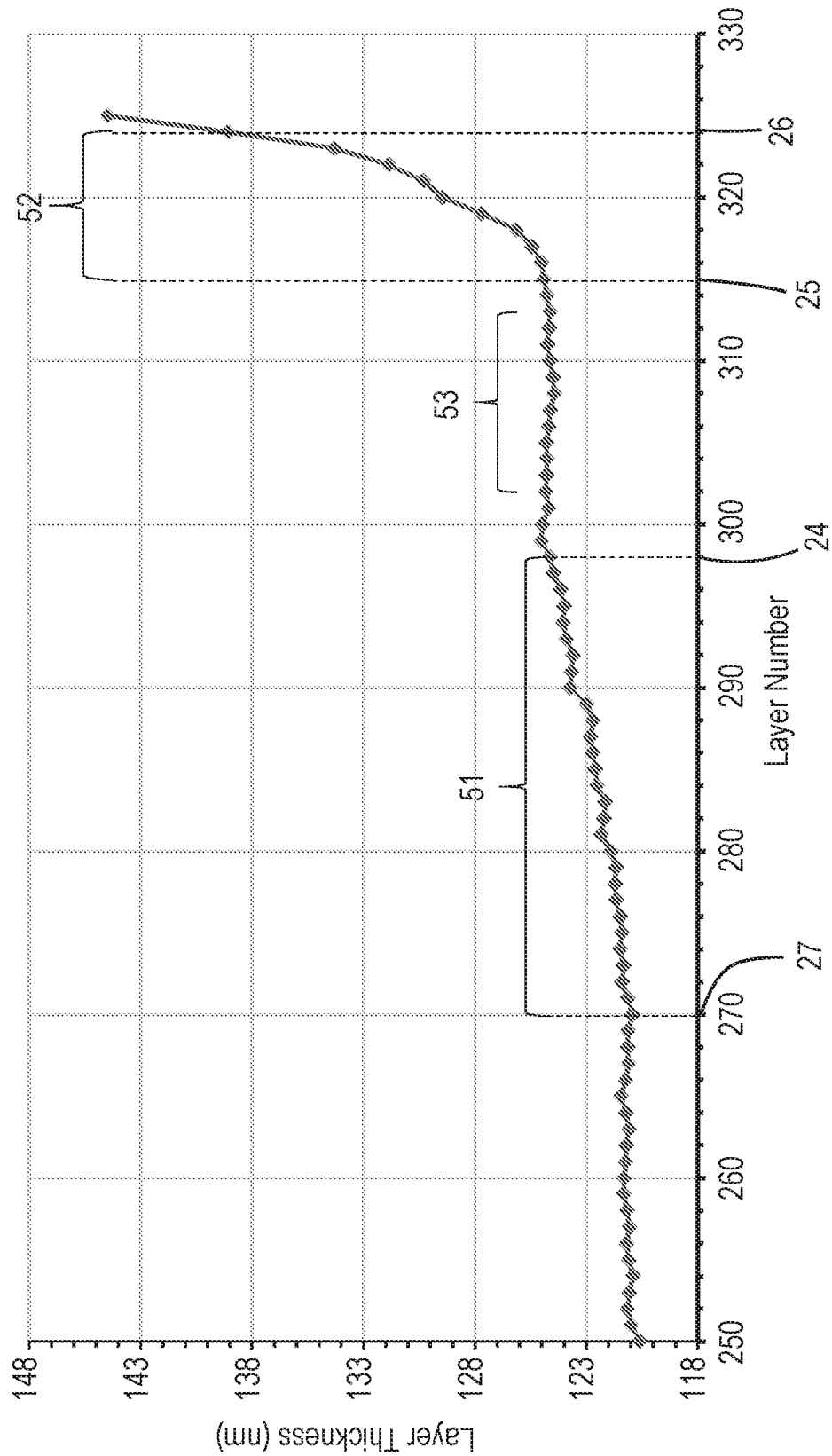

FIG. 3 is a plot 40 of average layer thickness versus layer number for a plurality of polymeric layers 10, 11, according to some embodiments. The thickness profile can be for a plurality of polymeric layers 10, 11 in an entire film or in a packet (e.g., 41 or 42) of a film. The average layer thickness is the thickness of the layer averaged (e.g., unweighted mean) over the area of the layer. FIGS. 4-5 show a portion of the plot of FIG. 3. The layer thicknesses profiles can be selected through suitable feedblock design and processing. For example, the axial rod heater power levels in the multilayer feedblock described in U.S. Pat. No. 6,783,349 (Neavin et al.) can be used to control the layer thickness profile.

The average layer thicknesses can be measured using an Atomic Force Microscope (AFM). To reduce the error of the measurement, the average thickness of a layer can be determined as a moving average. The layers can be numbered from the thinnest layer to the thickest layer and the moving average can average over 20 layers including 10 layers with lower layer numbers, the specified layer, and 9 layers with higher layer numbers. Near the ends of the profile, fewer layers are used in the moving average since fewer layers before or after the specified layer are available. For example, for a film or packet with 325 layers, the average thickness of layer 1 will be the average thickness of layers 1 to 10, the average thickness of layer 2 will be the average thickness of layers 1 to 11, the average thickness of layer 101 will be the average thickness of layers 91 to 110, the average thickness of layer 325 will be the average thickness of layers 315 to 325, and the average thickness of layer 324 will be the average thickness of layers 314 to 325.

In some embodiments, the plurality of polymeric layers 10, 11 include a first polymeric layer 12 having a largest average thickness t1 among the plurality of polymeric layers, and a second polymeric layer 13 disposed between a third polymeric layer 14 and the first polymeric layer 12, where the first and second polymeric layers 12 and 13 are separated by N1 polymeric layers, and the second and third polymeric layers separated by N2 polymeric layers. In some embodiments, $2 \leq N1 \leq 10$ and $N2 \geq 10$. In some embodiments, $N2 \geq 12$ or $N2 \geq 14$. The first, second and third polymeric layers 12, 13 and 14 have respective average thicknesses t1, t2 and t3. In some embodiments, t1 is greater than t2 by at least 10% and t2 is greater than t3 by at most 2%. In some embodiments, t1 is greater than t2 by at least 12%, or at least 14%, or at least 15%. In some such embodiments, or in other embodiments, t2 is greater than t3 by at most 1.5%, or by at most 1.2%.

In some embodiments, a plot 40 of an average layer thickness versus a layer number includes a knee region 30 separating a left region 31 where the polymeric layers have lower layer numbers and the average thickness increases with increasing layer number at a smaller rate, from a right region 32 where the polymeric layers have higher layer numbers and the average thickness increases with increasing layer number at a greater rate, such that the plurality of polymeric layers 10, 11 include a first polymeric layer (e.g., layer 15) in the right region 32 having an average thickness t1', a second polymeric layer (e.g., layer 13) in the knee region 30 having an average thickness t2', and a third polymeric layer 16 in the left region 31 having an average thickness t3'. The first polymeric layer is separated from the second polymeric layer by M1 polymeric layers, and the third polymeric layer is separated from the second polymeric layer by M2 polymeric layers. In some embodiments, 2≤M1≤10 and M2≥10. In some embodiments, t1' is greater than t2' by at least 10%, and t2' greater than t3' by at most 2%. As described further elsewhere herein, in some embodiments, the polymeric layers in right region 32 has a generally exponentially increasing thickness with increasing layer number.

In some embodiments, the optical film includes a plurality of first polymeric layers 51 (see, e.g., FIG. 5) arranged sequentially adjacent to each other along a first portion 61 (see, e.g., FIG. 1) of a thickness of the optical film and a plurality of second polymeric layers 52 arranged sequentially adjacent to each other along a second portion 62 of the thickness of the optical film. Each first and second polymeric layer can have an average thickness t less than about 300 nm. A thickest first polymeric layer 24 is the first polymeric layer closest to the second portion 62 (portion including layers 52). A thinnest second polymeric layer 25 is the second polymeric layer closest to the first portion 61 (portion including layers 51). The first polymeric layers 51 can number at least 10 in total. In some embodiments, the first polymeric layers 51 number at least 20, or at least 30, or at least 40 in total. The second polymeric layers 52 can number between 5 and 30 in total, or between 5 and 25 in total, or between 5 and 20 in total. The term "between" in this context should be understood to be inclusive (e.g. between 5 and 30, for example, can include 5 and can include 30). The thickest second polymeric layer 26 is thicker than the thinnest second polymeric layer 25 by at least 10%. In some embodiments, the thickest second polymeric layer 26 is thicker than the thinnest second polymeric layer 25 by at least 12% or at least 14%. The second portion 62 and the second polymeric layers 52 can optionally also include the layer 12 (see, e.g., FIG. 4) which would then be the thickest second polymeric layer. In some embodiments, the optical film further includes a plurality of third polymeric layers 53 arranged sequentially adjacent to each other along a third portion 63 of the thickness of the optical film, where the third portion is disposed between the first and second portions 61 and 62. The third polymeric layers 53 number at least 10 (or at least 12 or at least 14) in total. Each third polymeric layer 53 has a substantially same average thickness (e.g., each third polymeric layer 53 can have a thickness within about 3%, or within about 2%, or within about 1% of a mean thickness of the third polymeric layers 53).

Figure 6:
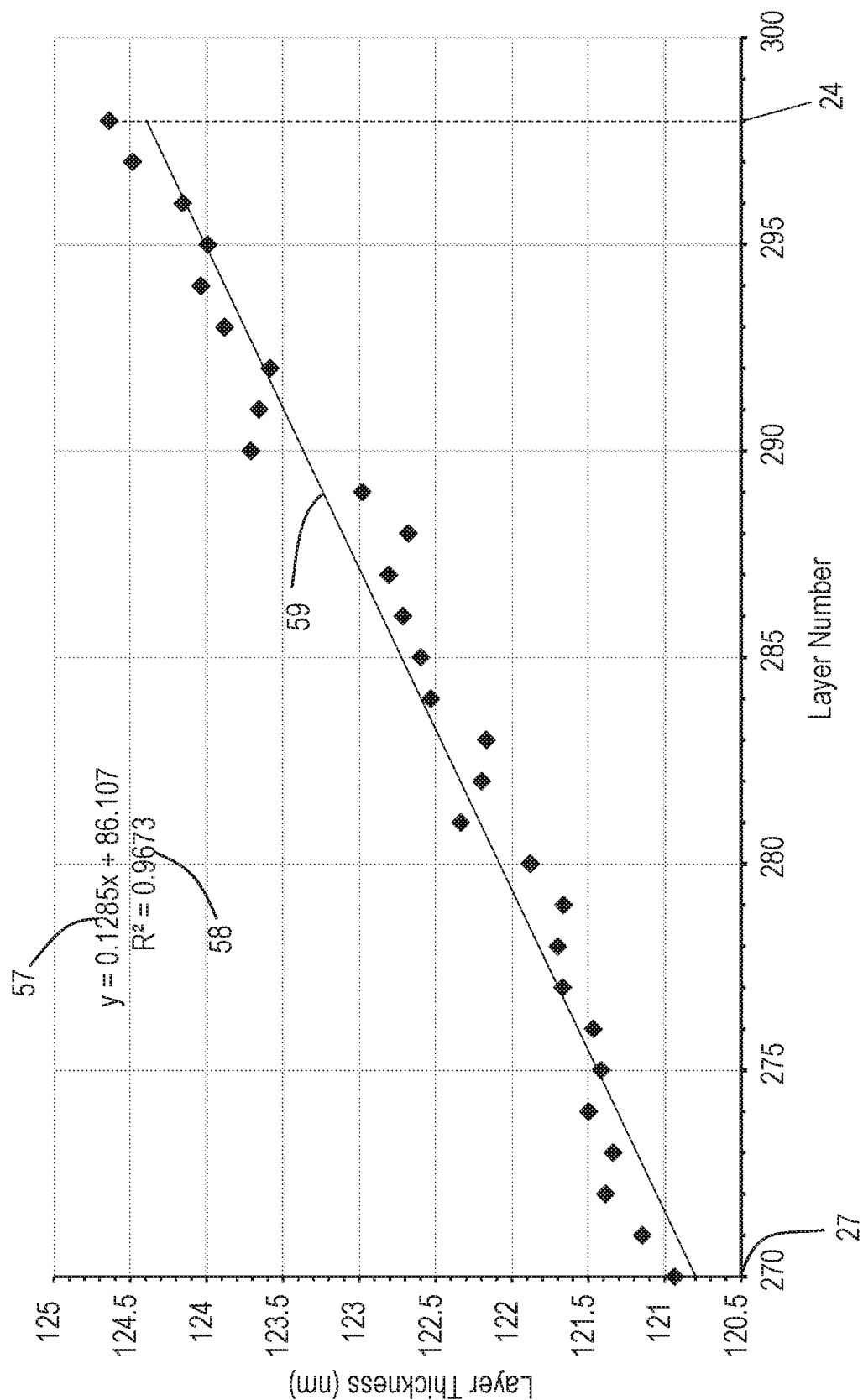

FIG. 6 is a portion of the plot 40 showing the average thicknesses of the first polymeric layers 51 in the first portion 61, according to some embodiments. In some embodiments, the average thickness of the first polymeric layers 51 increase substantially linearly (e.g., a r-squared value 58 greater than about 0.8) from the thinnest (27) to the thickest (24) first polymeric layers at a rate 57 of less than about 0.25 nm per layer. In some embodiments, the rate of thickness increase of the first polymeric layers 51 is less than about 0.2 nm per layer, or less than about 0.15 nm per layer. In some embodiments, the rate of thickness increase of the first polymeric layers 51 is in a range of about 0.05 nm per layer to about 0.25 nm per layer, for example. The rate can be determined as a slope of a best linear fit 59 to the average thickness of the first polymeric layers 51 from the thinnest (27) to the thickest (24) first polymeric layers. In some embodiments, the best linear fit 59 has an r-squared value 58 greater than about 0.8, or greater than about 0.85, or greater than about 0.9, or greater than about 0.93, or greater than about 0.95.

In some embodiments, an optical film 100, 100' includes a plurality of polymeric layers 10, 11 arranged along at least a portion of a thickness of the optical film and sequentially numbered from 1 to N, where N is an integer greater than about 100. The plurality of polymeric layers includes a polymeric end layer 22, 23 or 22, 123 at each end thereof. In some embodiments, the polymeric end layers 22, 23 and each of the polymeric layers 10, 11 therebetween has an average thickness less than about 300 nm (see, e.g., FIG. 1). In other embodiments, the optical film can optionally include at least one layer 43a, 43b (see, e.g., FIG. 2) having an average thickness tc greater than about 1 micrometer (or in any of the thickness ranges described elsewhere herein) disposed between the polymeric end layers 22, 23. Any such thick layer(s) that may be included in the optical film may be considered separate layer(s) that are not included in the plurality of polymeric layers 10, 11 and may be omitted in the sequential numbering from 1 to N. The numbering from 1 to N can alternatively refer to layers in a single packet. For example, the layers sequentially numbered from 1 to N can be the layers of the first plurality 41 of polymeric layers starting with end layer 123 and ending with end layer 22, or starting with end layer 22 and ending with end layer 123. In some embodiments, the polymeric end layers 22, 123 and each of the polymeric layers 10, 11 therebetween has an average thickness less than about 300 nm.

Figure 7:
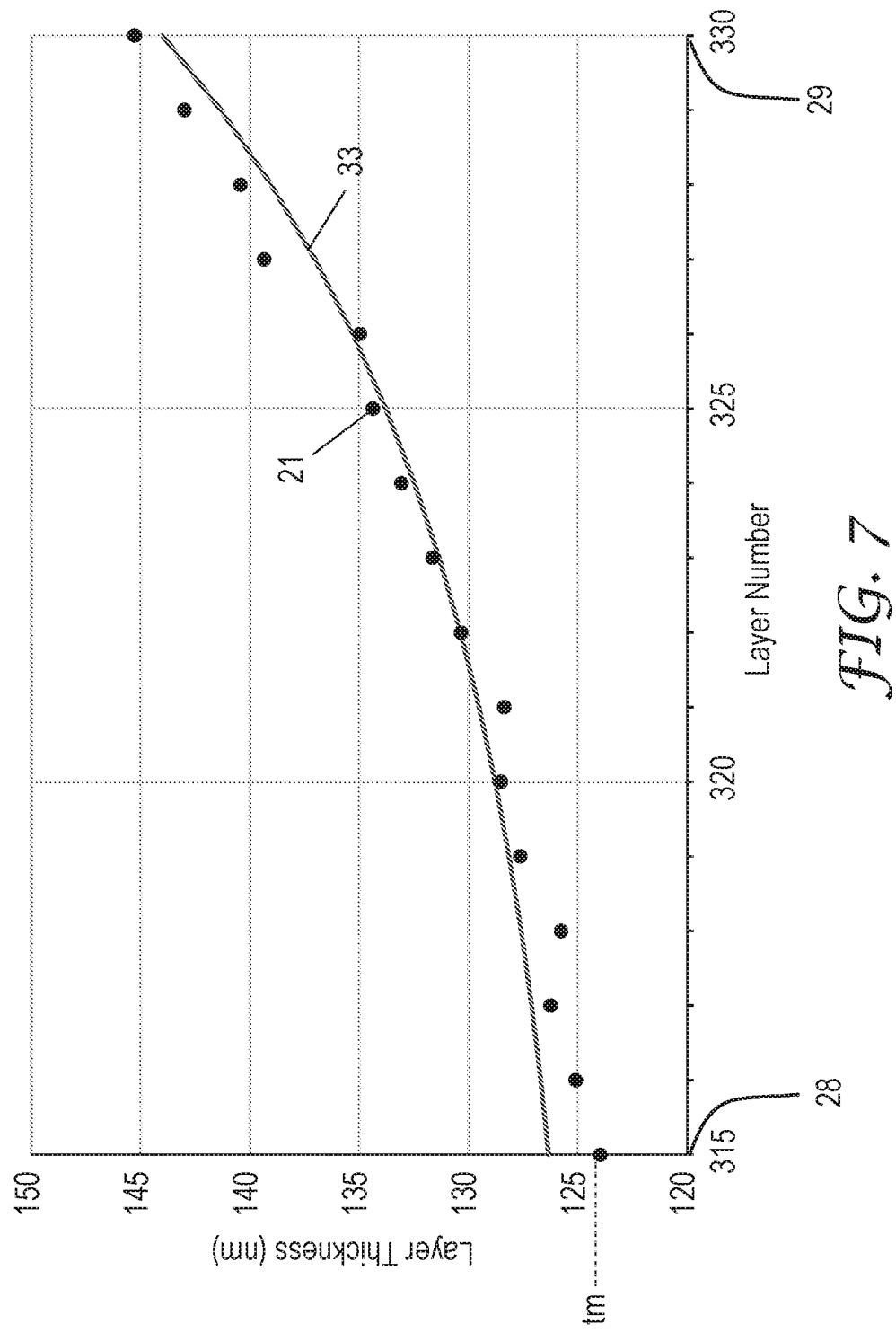
FIG. 7 is a schematic illustrative plot of average layer thickness versus layer number for a portion of a plurality of polymeric layers.

FIG. 7 is a plot of average layer thickness 21 versus layer number for an mth layer 28 to an Nth layer 29, according to some embodiments. In some embodiments, an mth layer 28 in the plurality of the polymeric layers 10, 11 has an average thickness tm, m<N, such that an average thickness of each polymeric layer in the plurality of polymeric layers 10, 11 having a layer number n, m≤n≤N, is within about 10% of $$tm + A\, e^{\frac{-(N-n)}{d}}$$

(curve 33), where A is a real number and d is an integer. In some embodiments, 0.01 tm≤A≤0.25 tm or 0.01 tm≤A≤0.2 tm. In some embodiments, 0.005N≤d≤0.1N or 0.01N≤d≤0.1N. In some embodiments, N-m≥5, or N-m≥8, or N-m >10. In some embodiments, the average thickness of the polymeric layer 29 having the layer number N is at least about 10%, or at least about 12%, or at least about 14% greater than tm. In some embodiments, the average thickness of each polymeric layer in the plurality of polymeric layers 10, 11 having a layer number n, m≤n≤N, is within about 5%, or within about 4%, or within about 3% of $$tm + A\, e^{\frac{-(N-n)}{d}}.$$

In some embodiments, the average thickness of each polymeric layer in the plurality of polymeric layers 10, 11 having a layer number n, m<n≤N, is within about 5%, or within about 4%, or within about 3%, or within about 2% of $$tm + A\ e^{\frac{-(N-n)}{d}}.$$

For the illustrated curve 33, d=7, A=20 nm, N=330, m=315, and tm=124 nm. The parameter A specifies the amplitude of the apodization (shift in layer thickness profile near a side of a packet or film) and the parameter d determines the number of layers having a significant shift in thickness.

Figure 8:
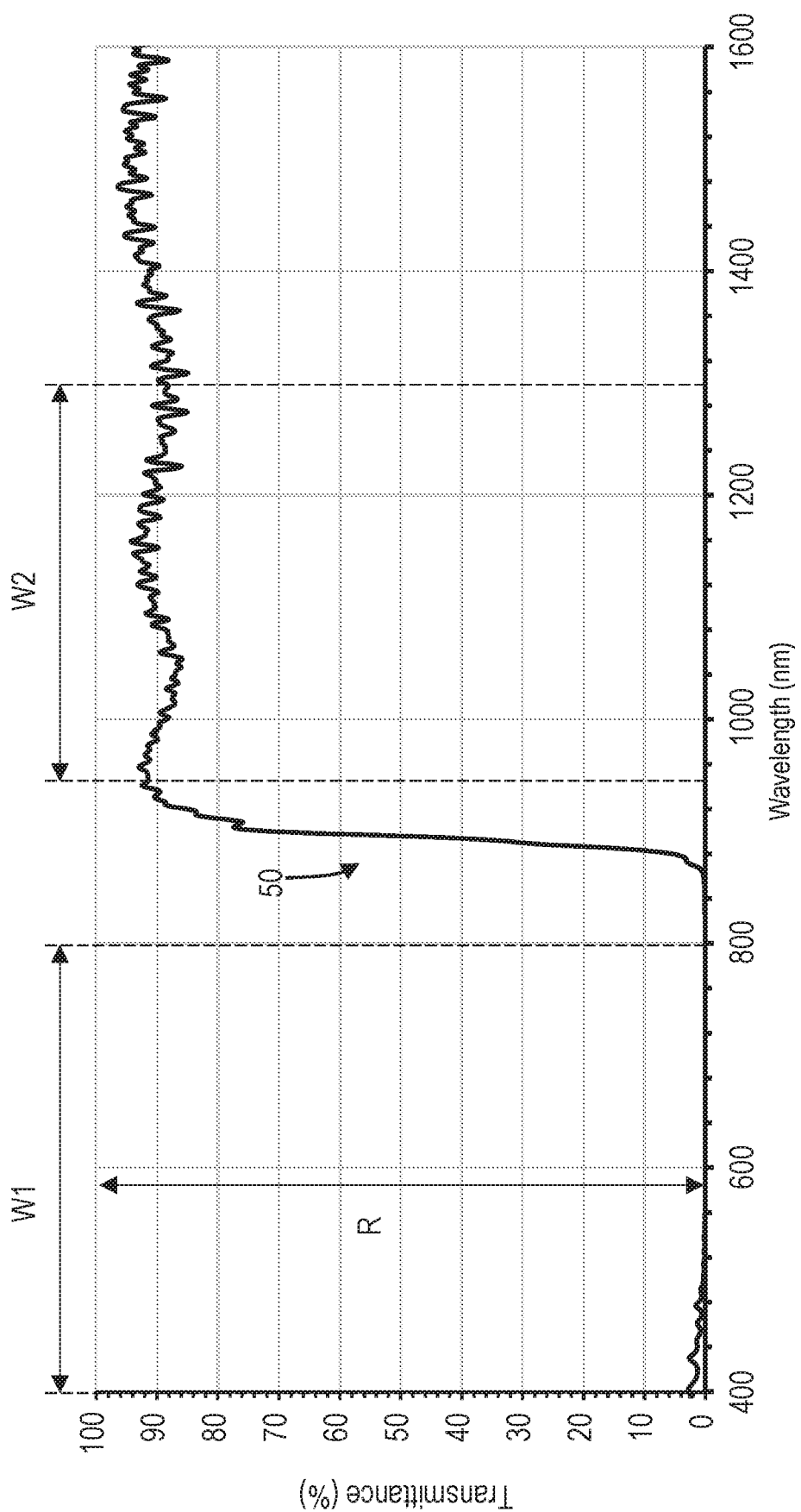
FIG. 8 is an illustrative plot of transmittance versus wavelength for light substantially normally incident on an optical film.

FIG. 8 is a plot of transmittance versus wavelength for light substantially normally incident on an optical film, according to some embodiments. The optical film can be a mirror film, or the optical film can be a reflective polarizer and the transmittance can be for light in a first (block) polarization state. In some embodiments, for substantially normally incident light 70 and a first wavelength range W1 extending from about 400 nm to at least about 600 nm (e.g., to about 600 nm, or to about 700 nm, or to about 800 nm), the plurality of polymeric layers 10, 11, or the optical film 100, 100': reflects greater than about 80% of the incident light 70 in the first wavelength range W1 for the first polarization state 171 and for an orthogonal second polarization state 172. In some embodiments, for substantially normally incident light 70 and a first wavelength range W1 extending from about 400 nm to at least about 600 nm (e.g., to about 600 nm, or to about 700 nm, or to about 800 nm) and a second wavelength range W2 extending from about 950 nm to at least about 1200 nm (e.g., to about 1200 nm or to about 1300 nm), the plurality of polymeric layers 10, 11, or the optical film 100, 100': reflects greater than about 80% of the incident light having a first polarization state 171 in the first wavelength range W1; transmits greater than about 40% of the incident light having a second polarization state 172, orthogonal to the first polarization state 171, in the first wavelength range W1; and, in some embodiments, transmits greater than about 70% of the incident light in the second wavelength range W2 for each of the first and second polarization states 171 and 172. Transmitting (resp., reflecting) a specified percent of an incident light over a specified wavelength range can be understood to mean that the average optical transmittance (resp., average optical reflectance) for the incident light over the specified wavelength range is the specified percent. In some embodiments, the optical film reflects greater than about 90% or greater than about 95% of the incident light having the first polarization state 171 in the first wavelength range W1. In some embodiments, the optical film is substantially non-absorbing so that an optical reflectance R of the optical film is substantially equal to 100% minus the optical transmittance of the optical film. In some embodiments, the optical film 100, 100', or the plurality of polymeric layers 10, 11, transmits greater than about 45%, or greater than about 50%, or greater than about 55%, or greater than about 60% of the incident light having the second polarization state 172 in the first wavelength range W1. In some embodiments, the 100, 100', or the plurality of polymeric layers 10, 11, transmits greater than about 75%, or greater than about 80%, or greater than about 85% of the incident light in the second wavelength range W2 for each of the first and second polarization states 171 and 172. In some embodiments, for substantially normally incident light 70 having the first polarization state 171, the optical film 100, 100', or the plurality of polymeric layers 10, 11, has an average optical transmission of no less than about 89.5% in a wavelength range from about 950 nm to about 1200 nm or to about 1300. In the embodiment illustrated in FIG. 8, the average optical transmission is about 90.1% in the wavelength range from about 950 nm to about 1200 nm, and about 89.9% in the wavelength range from about 950 nm to about 1300 nm.

In some embodiments, the optical film has a band edge 50 between the first and second wavelength ranges W1 and W2. In some embodiments, for a substantially normally incident light having a first polarization state, an optical transmittance of the optical film includes a band edge 50 between about 850 nm and about 950 nm, such that a best linear fit to the band edge correlating the optical transmittance to wavelength at least across a wavelength range where the optical transmittance increases from about 10% to about 70% has a slope that is less than about 4%/nm, or the slope can be in any range described elsewhere herein. In some embodiments, the optical film is a mirror film and has a band edge 50 for each of the orthogonal first and second polarization states, while in other embodiments the optical film is a reflective polarizer and has the band edge 50 for the first, but not the second, polarization state.

Figure 9:
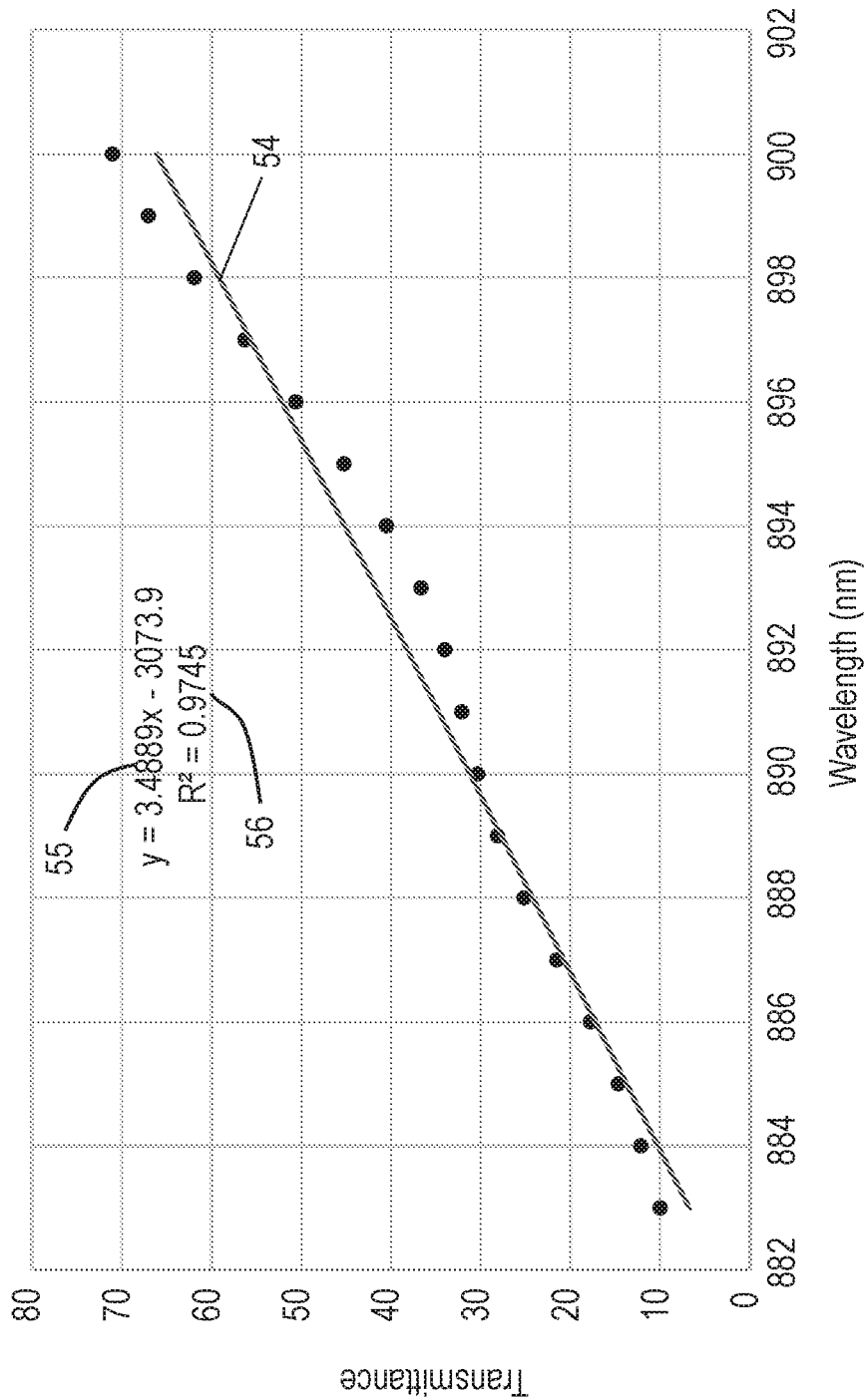
FIG. 9 is a portion of the plot of FIG. 8 near a band edge.

FIG. 9 is a portion of the plot of FIG. 8 near the band edge 50. In some embodiments, an optical transmittance of the optical film includes a band edge 50 between about 850 nm and about 950 nm, such that a best linear fit 54 to the band edge 50 correlating the optical transmittance to wavelength at least across a wavelength range where the optical transmittance increases from about 10% to about 70% has a slope 55 that is less than about 4%/nm. In some embodiments, the slope 55 of the best linear fit 54 is less than about 3.5%/nm or less than about 3%/nm, or less than about 2%/nm, or less than about 1.5%/nm, or less than about 1%/nm, or less than about 0.8%/nm, or less than about 0.7%/nm. In some embodiments, a lower slope (e.g., less than about 2%/nm, or 0.1%/nm to 2%/nm) is preferred for reduced color shift of reflected light. In other embodiments, a higher slope (e.g., greater than about 2%/nm) is preferred for improved transmission in the near infrared, for example, but it still may be preferred that the slope is less than about 4%/nm for desired color shift properties, for example. A higher slope may be preferred when the band edge is farther into the infrared and a lower slope may be preferred when the band edge is closer to, or in, the visible range. In some embodiments, the best linear fit 54 to the band edge 50 has an r-squared value 56 of greater than about 0.8, or greater than about 0.85, or greater than about 0.9, or greater than about 0.93, or greater than about 0.95. In some embodiments, the band edge 50 is at a different wavelength than illustrated in FIGS. 8-9. In some embodiments, the band edge 50 is between about 600 nm and about 950 nm, or between about 600 nm and about 800 nm.

In some embodiments, a wavelength range from a smallest wavelength greater than about 600 nm where the transmittance is at least about 20% to a smallest wavelength greater than about 600 nm where the transmittance is at least about 80% is greater than about 80 nm wide, or greater than about 90 nm wide, or greater than about 100 nm wide.

In some embodiments, an optical film 100, 100' includes a plurality of polymeric layers 10, 11 arranged along at least a first thickness portion of the optical film and sequentially numbered from 1 to N, where N is an integer between 50 and 800. The first thickness portion can be the portion between layers 46 and 47 in FIG. 1, the portion corresponding to one of the first and second pluralities 41 and 42 of layers in FIG. 2, or the portion corresponding to both of the first and second pluralities 41 and 42 of layers in FIG. 2, but excluding the portion corresponding to the at least one layer 43a, 43b. Each layer of the optical film in the first thickness portion has an average thickness less than about 300 nm. In some embodiments, the optical film is an infrared transmissive reflective polarizer. In some embodiments, a plot 40 of an average layer thickness versus a layer number has a profile causing the plurality of polymeric layers to: reflect greater than about 80% of a substantially normally incident light 70 having a first polarization state 171 in a first wavelength range W1 extending from about 400 nm to about 800 nm; transmit greater than about 40%, or greater than about 50%, of the incident light 70 having a second polarization state 172, orthogonal to the first polarization state 171, in the first wavelength range W1; transmit greater than about 89.5% of the incident light in a second wavelength range W2 extending from about 950 nm to about 1300 nm for each of the first and second polarization states 171, 172; and have an optical transmittance band edge 50 between about 850 nm and about 950 nm for the incident light having the first polarization state, such that a best linear fit to the band edge correlating the optical transmittance to wavelength at least across a wavelength range where the optical transmittance increases from about 10% to about 70% has a slope 55 that is less than about 4%/nm. In some embodiments, the slope 55 is less than about 3.5%/nm or the slope 55 can be in any of the ranges described elsewhere herein.

Figure 10:
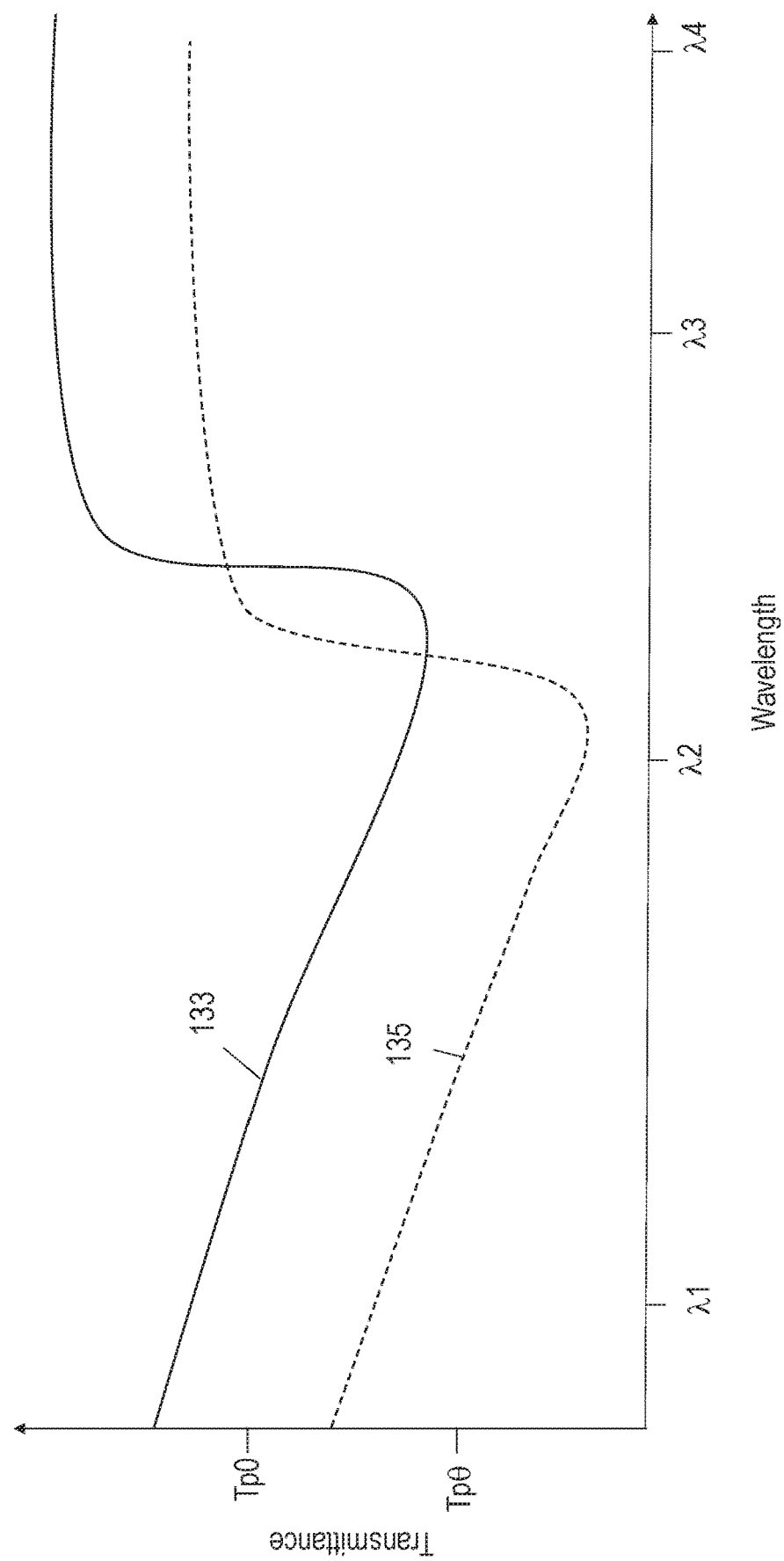
FIG. 10 is a schematic illustrative plot of optical transmittance versus wavelength for light substantially normally incident on a reflective polarizer in a pass polarization state.

FIG. 10 is a schematic plot of optical transmittance as a function of wavelength for a reflective polarizer for light having a pass polarization state (e.g., the second polarization state 172), according to some embodiments. The pass polarization state can be a p-polarization state (p-pol) or an s-polarization state (s-pol) with the projection of the electric field onto a plane of the reflective polarizer being parallel to a pass axis (e.g., x-axis) of the reflective polarizer. The optical transmittance 133 for substantially normally incident light 70 and the optical transmittance 135 for light 170 at an incident angle θ are shown. The average transmittances Tp0 and Tpθ over a wavelength range of λ1 to λ2 are indicated. λ1 may be about 400 nm and λ2 may be about 600 nm, about 700 nm, or about 800 nm, for example. The wavelength range of λ1 to λ2 may correspond to the first wavelength range W1. In some embodiments, the transmittance rapidly increases for wavelengths larger than λ2 so that the transmittance is larger in the second wavelength range W2 than in the first wavelength range W1. In some embodiments, for the second polarization state and for the first wavelength range W1, the reflective polarizer has an average optical transmittance Tp0 greater than about 40%, or greater than about 45%, or greater than about 50%, or greater than about 55%, or greater than about 60%. In some embodiments, for the second polarization state 172 and the first wavelength range W1, the reflective polarizer has a greater average optical transmittance (e.g., Tp0) for light incident at a smaller incident angle (e.g., zero degrees to about 20 degrees, or approximately zero degrees) and a smaller average optical transmittance (e.g., Tpθ) for light incident at a greater incident angle (e.g., about 30 degrees to about 50 degrees, or about 45 degrees). In some embodiments, the second polarization state 172 is a p-polarization state and the greater incident angle is less than about 50 degrees. In some embodiments, the reflective polarizer has a greater average optical transmittance (e.g., Tp0) for light incident at a smaller incident angle and a smaller average optical transmittance (e.g., Tpθ) for light incident at a greater incident angle for light in a pass polarization state for each of a p-pol and an s-pol light. In some embodiments, the reflective polarizer has a greater average optical transmittance (e.g., Tp0) for substantially normally incident light and a smaller average optical transmittance (e.g., Tpθ) for light incident at an angle of incidence of about 45 degrees for a second (pass) polarization state for any plane of incidence. In some embodiments, a difference (e.g., Tpθ−Tp0) between the greater average optical transmittance and the smaller average optical transmittance is at least 10%, or at least 20%, or at least 30%.

The linear fits described herein can be linear least squares fits as is known in the art. Polynomial fits can similarly be least squares fits. Such fits minimize the sum of squares of residuals where a residual is the difference between data and the fitted curve (line or polynomial). The least squares analysis allows the r-squared value, sometimes referred to as the coefficient of determination, to be determined.

EXAMPLES

| Materials Used in the Examples | |
|---|---|
| Abbreviation | Description and Source |
| PEN | Polyethylene Naphthalate, obtained from 3M Corporation, Saint Paul, MN |
| PETG | A glycol modified copolyester, obtained under the trade designation PETG GN071 from Eastman Chemicals, Knoxville, TN |
| PC1804 | A polycarbonate material, obtained under the trade designation MAKROLON 1804 from Covestro Corporation, Leverkusen, Germany |
| PC2405 | A polycarbonate material, obtained under the trade designation MAKROLON 2405 from Covestro Corporation, Leverkusen, Germany |
| PCTG | A glycol modified copolyester, obtained under the trade designation VM318 PCTG from Eastman Chemicals, Knoxville, TN |

A numerical modelling study was completed using three different layer thickness profiles composed of 650 microlayers sandwiched between two thicker skin layers. The 650 microlayers alternated between a birefringent High Index Optical layer (HIO) and an isotropic Low Index Optical layer (LIO). The refractive indices used for this model at 633 nm are shown in the table below. These indices were inferred from a multilayer optical reflective polarizer. That film was produced via a multilayer coextrusion process using PEN as the HIO material and a polymer blend of 15.0 weight percent PETG, 40.8 weight percent PCTG, 17.0 weight percent PC1804, and 27.2 weight percent PC2405 as the LIO material. The films were then stretched continuously in a standard tenter with a draw ratio of 6:1 in the transverse direction and constrained in the machine direction (no orientation or relaxation). The oven temperature used for the orientation was 270 degrees Fahrenheit. The indices were inferred by using a numerical model finding what indices gave the best fit between measured spectra and calculated spectra for a 650 microlayer film. The layer thicknesses were measured using an Atomic Force Microscope (Dimension ICON from Bruker Instruments, Billerica, MA).

| | $n_x$ | $n_y$ | $n_z$ |
|---|---|---|---|
| HIO | 1.8260 | 1.6355 | 1.4893 |
| LIO | 1.5699 | 1.5699 | 1.5699 |

Figure 11:
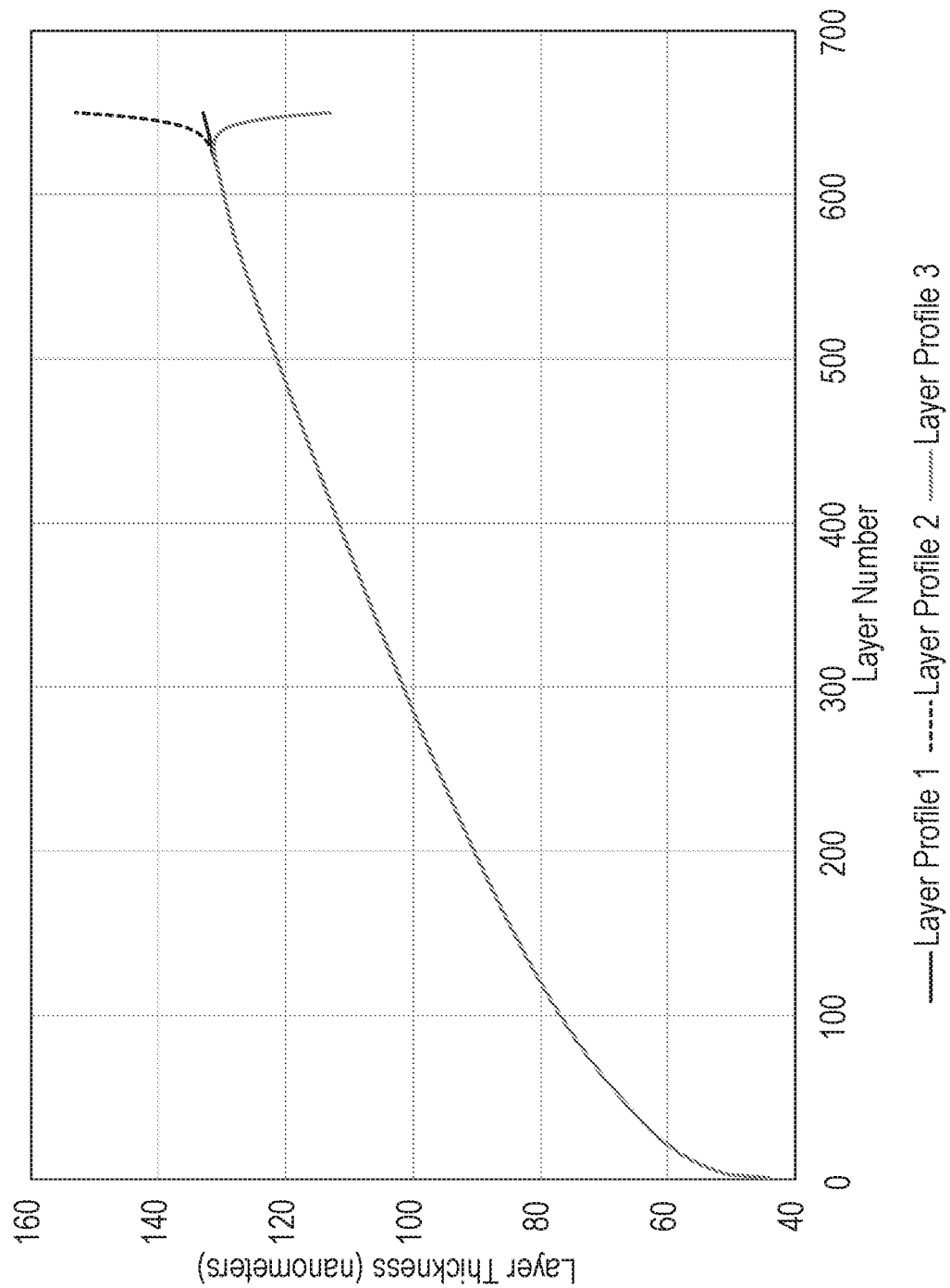
FIG. 11 is a plot of average layer thickness versus layer number for various illustrative optical films.

Three model layer thickness profiles are shown in FIG. 11 and are defined as follows:

Layer Profile 1: A proposed layer profile designed to provided reflectivity from about 400 nanometers to about 930 nanometers for the block polarization state.

Layer Profile 2: compared to Layer Profile 1 it has an apodized "up" configuration $$t = tm + Ae^{\frac{-(N-n)}{d}},$$

utilizing an exponential relationship, where A is an amplitude factor, d describes how many layers the apodized feature penetrates, tm is a layer thickness at the beginning of the apodized feature, N is the total number of layers, and n is the layer number. For Layer Profile 2, A=20 nm and d=5.

Layer Profile 3: compared to Layer Profile 1 it has an apodized "down" configuration utilizing the same functional form as Layer Profile 2. For Layer Profile 3, A=−20 nm and d=5.

To simulate the optical performance of these layer profiles with these materials a numerical optical model was employed to calculate the resulting transmission spectra for these reflective polarizers in the block state. The calculations were made for each layer profile with each skin layer composed of the LIO material being 1.5, 2.5, and 5.0 micrometers thick. The table below defines the parameters for Reflective Polarizers 1 through 9 and shows the calculated average transmission over the 930 to 980 nanometer band for each layer profile (average for all skin thicknesses) and the average bandwidth for each layer profile (average for all skin thicknesses). The bandwidths were calculated from the first wavelength the transmission reaches 20% to the wavelength where the transmission finally achieves 80%.

| Reflective Polarizer | Layer Profile | Apodization | Skin Thickness (micrometers) | Bandwidth (nanometers) | Average % Transmission (930 to 980 nanometers) |
|---|---|---|---|---|---|
| 1 | 1 | Standard | 1.5 | 71 | 56.7 |
| 2 | 2 | Up | 1.5 | 117 | 43.6 |
| 3 | 3 | Down | 1.5 | 14 | 82.4 |

| Reflective Polarizer | Layer Profile | Apodization | Skin Thickness (micrometers) | Bandwidth (nanometers) | Average % Transmission (930 to 980 nanometers) |
|---|---|---|---|---|---|
| 4 | 1 | Standard | 2.5 | 43 | 70.0 |
| 5 | 2 | Up | 2.5 | 105 | 43.1 |
| 6 | 3 | Down | 2.5 | 18 | 83.2 |
| 7 | 1 | Standard | 5 | 61 | 64.8 |
| 8 | 2 | Up | 5 | 126 | 38.9 |
| 9 | 3 | Down | 5 | 8 | 88.4 |

The reflective polarizers with "Up" apodization are exemplary reflective polarizers (Reflective Polarizers 2, 5, and 8) while those with "Standard" and "Down" apodization are comparative reflective polarizers.

Figure 12:
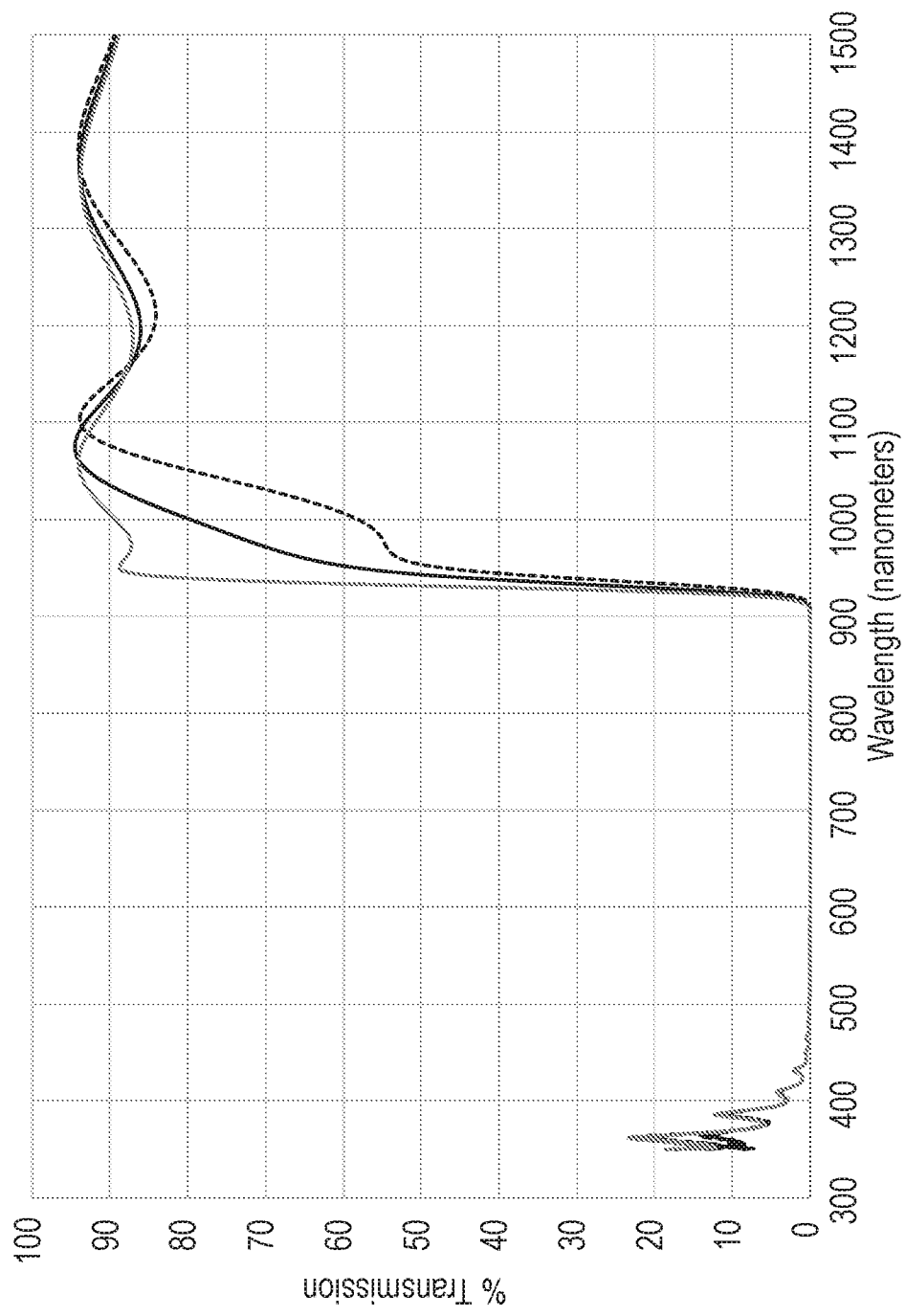
FIGS. 12-14 are block state transmission spectra for substantially normally incident light for various reflective polarizers.
Figure 13:
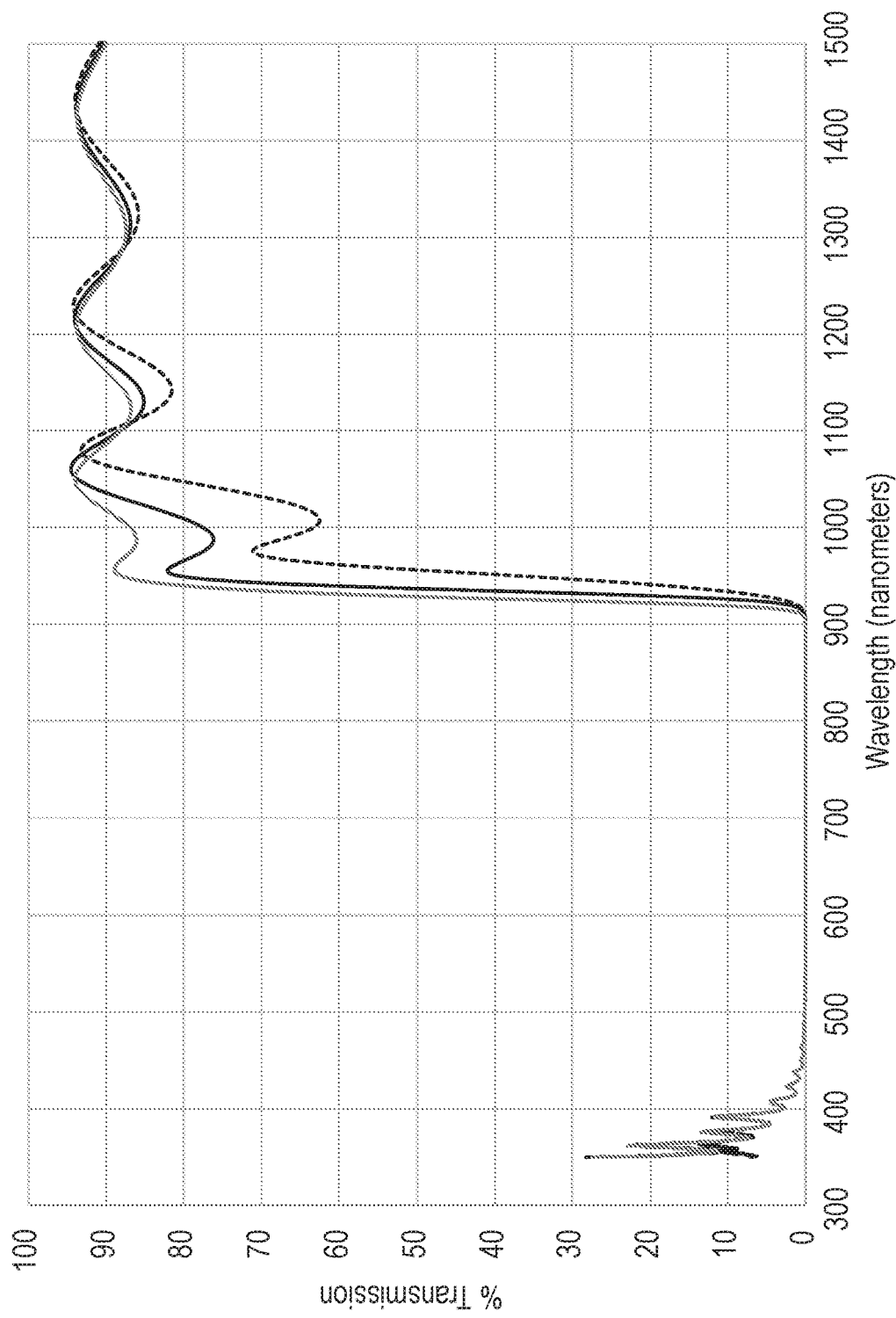
Figure 14:
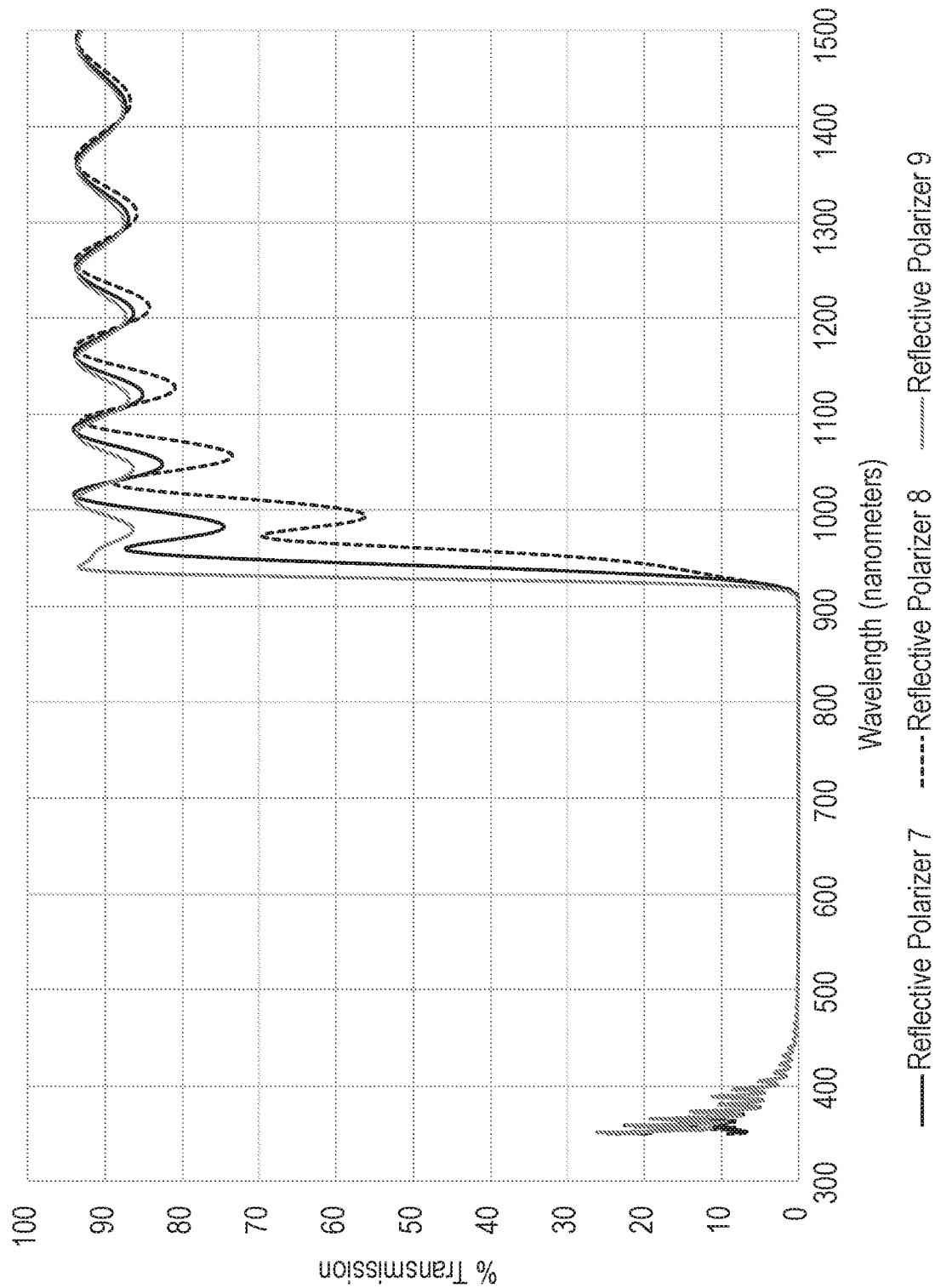

The resulting block state transmission spectra are shown in FIG. 12 for 1.5 micrometer thick skin layers (Reflective Polarizers 1, 2, and 3); FIG. 13 for 2.5 micrometer thick skin layers (Reflective Polarizers 4, 5, and 6); and in FIG. 14 for 5.0 micrometer thick skin layers (Reflective Polarizers 7, 8, and 9).

Figure 15:
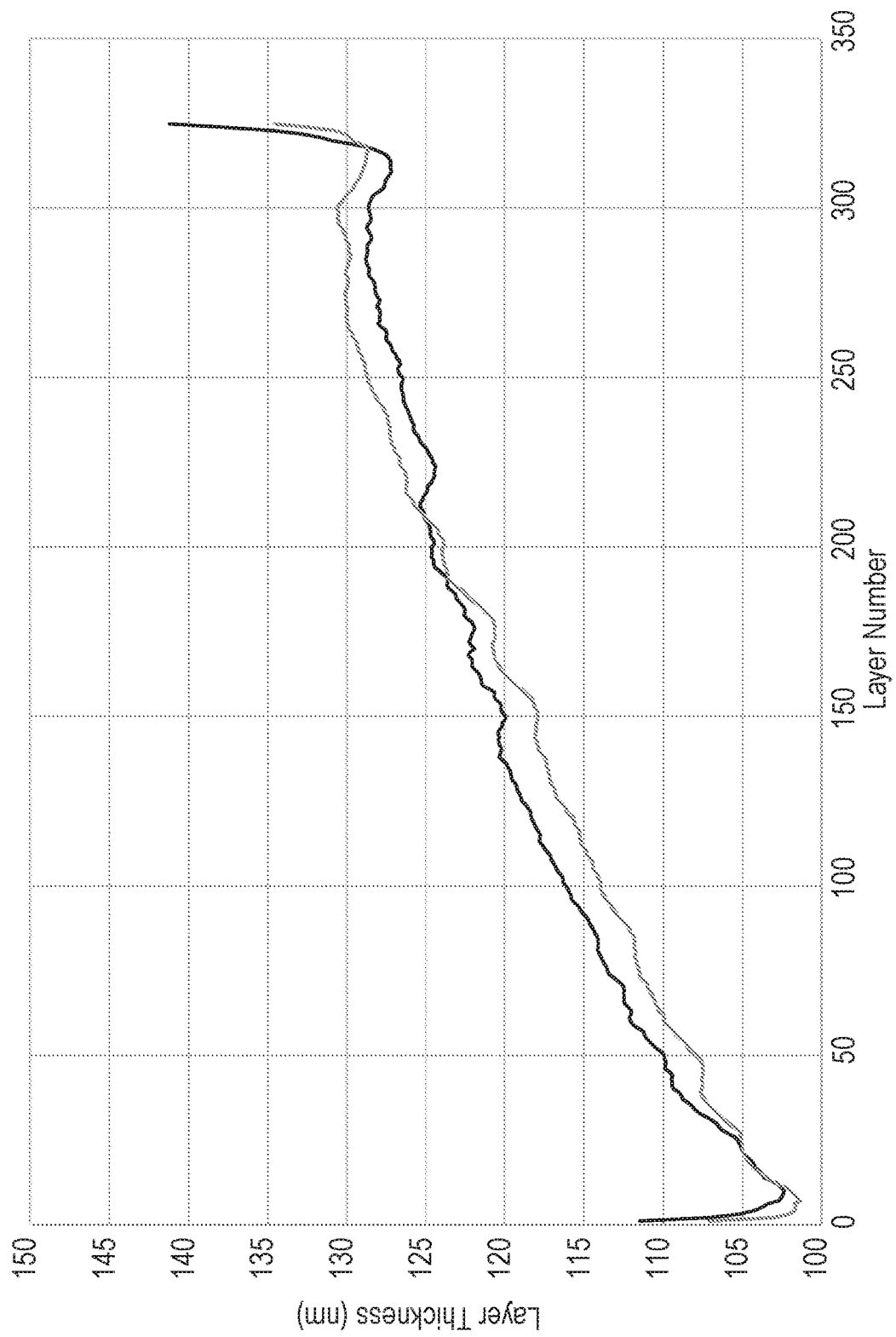
FIG. 15 is a plot of average layer thickness versus layer number for two reflective polarizers.
Figure 16:
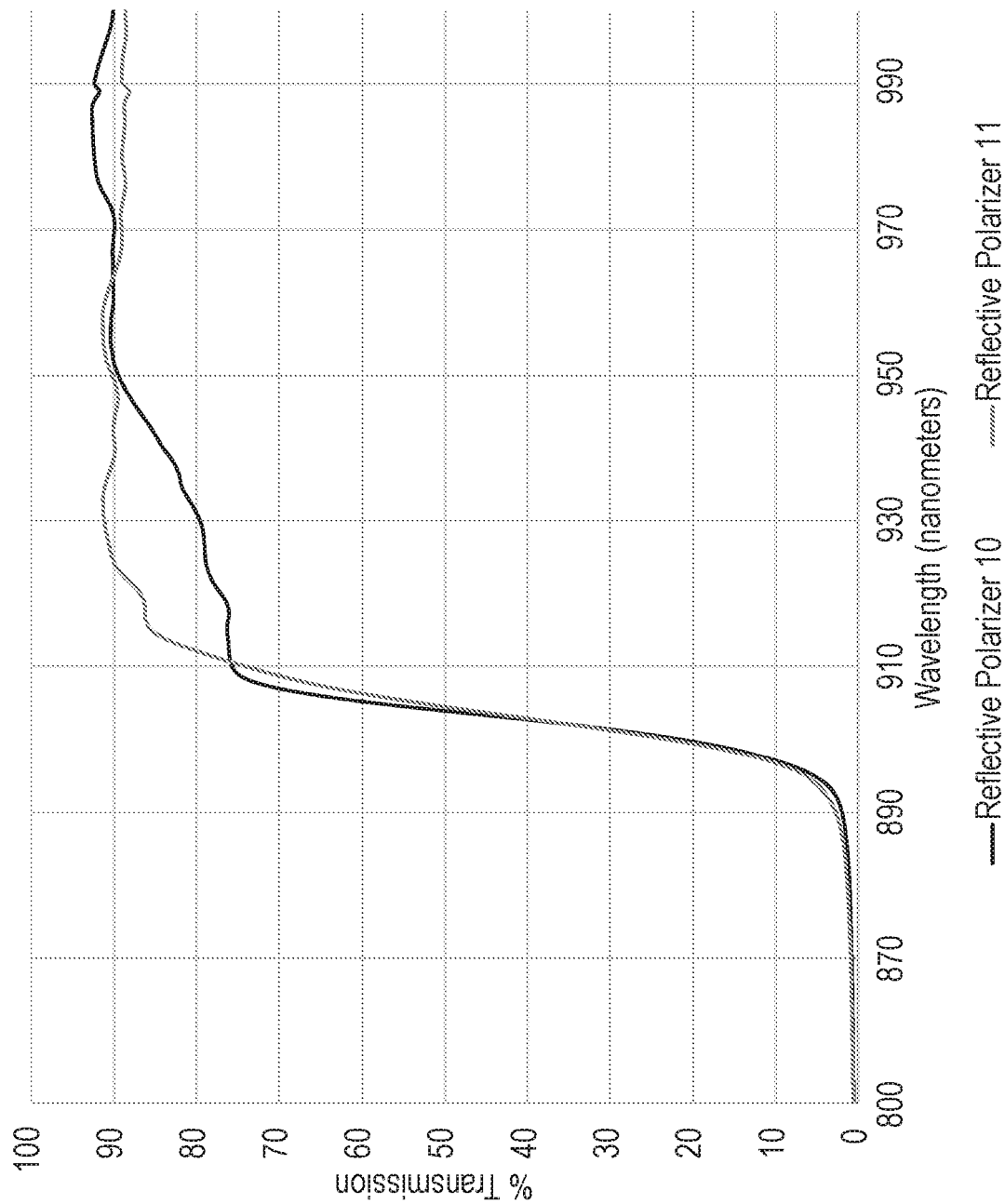
FIG. 16 shows block state transmission spectra for substantially normally incident light for the reflective polarizers of FIG. 15.

FIGS. 15 and 16 show experimental layer thickness profiles and transmission spectra, respectively, for Reflective Polarizers 10 and 11 showing the relationship between layer thickness profile and transmission spectra shape. The materials, layer configuration, and process conditions used to make these films were described above and the layer thickness profiles were measured with the same Atomic Force Microscopy system. The process parameter used to select these layer thicknesses profiles was the axial rod heater power levels in the multi-layer feedblock as described in U.S. Pat. No. 6,783,349 (Neavin et al.). The skin layers were 1.5 micrometers thick for Reflective Polarizers 10 and 11. FIG. 15 shows the measured layer thickness profiles for the last 325 layers delivered by the feedblock system for the two reflective polarizer films. FIG. 16 shows the resulting block state transmission spectra for Reflective Polarizers 10 and 11. Reflective Polarizer 11 had fewer layers having a high positive slope compared to Reflective Polarizer 10. Reflective Polarizer 11 showed higher transmission in for the wavelength range (910 to 950 nm) adjacent to the right band edge than Reflective Polarizer 10.

Figure 17:
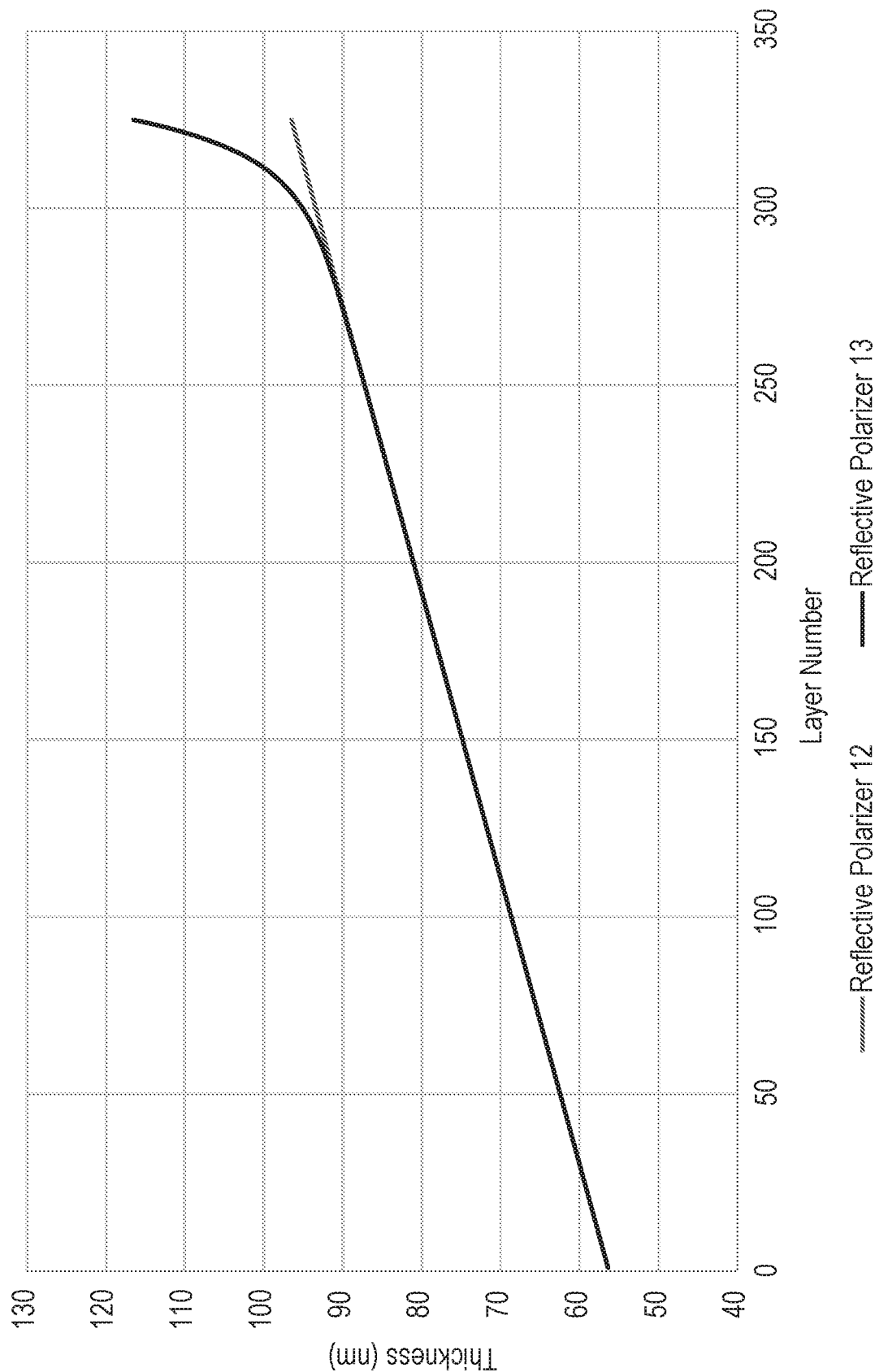
FIG. 17 is a plot of average layer thickness versus layer number for different reflective polarizers.
Figure 18:
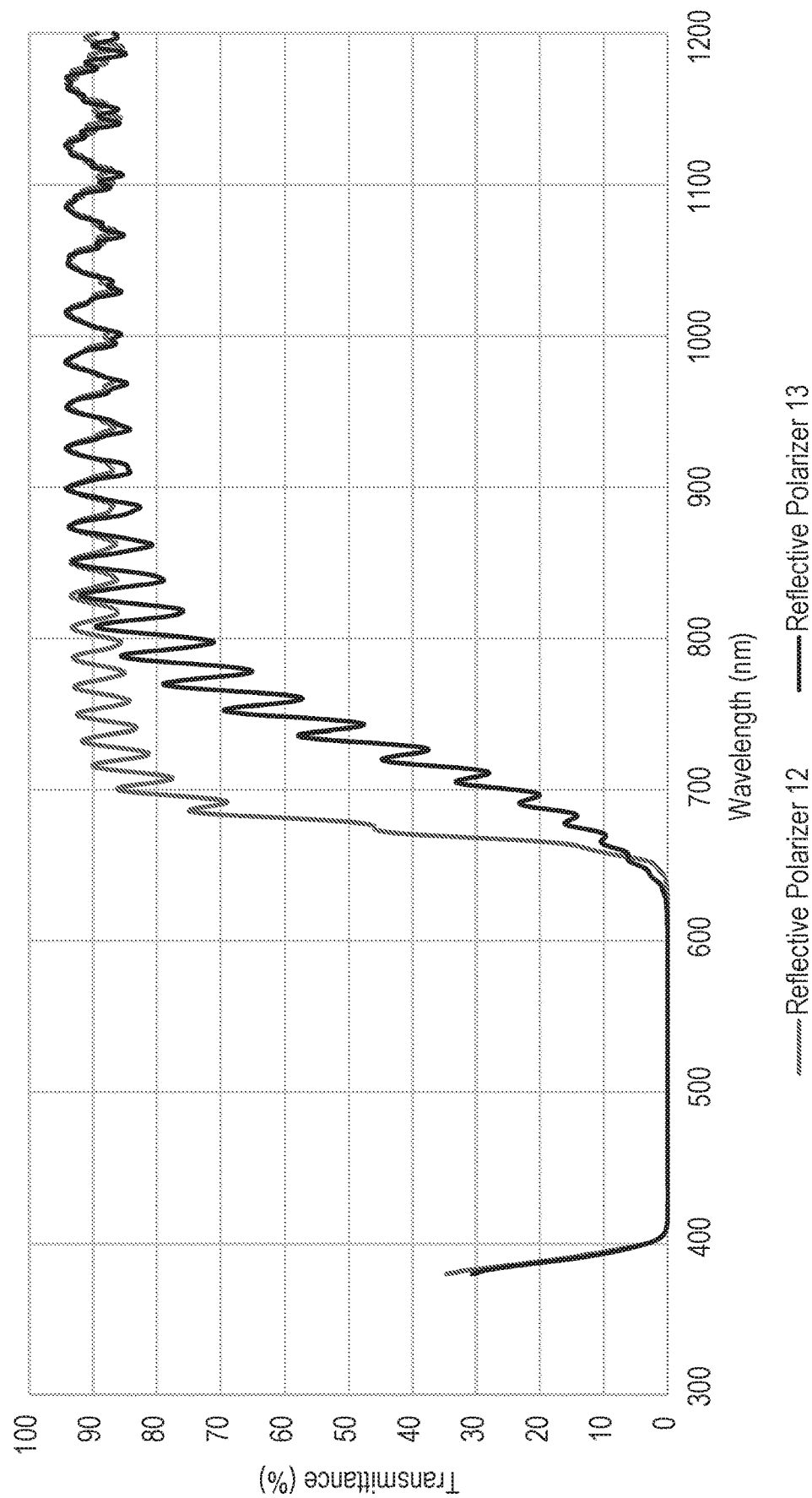
FIG. 18 shows block state transmission spectra for substantially normally incident light for the reflective polarizers of FIG. 17.

FIG. 17 is a plot of the layer thickness profile for Reflective Polarizers 12 and 13. Reflective Polarizer 12 was a modeled comparative reflective polarizer having a "standard" apodization and Reflective Polarizer 13 was a modeled exemplary reflective polarizer having an "up" apodization as generally described for Layer Profile 2 but with A=20 nm and d=10. FIG. 18 is a plot of the normal incidence transmittance for Reflective Polarizers 12 and 13 in the block state. A best linear fit to the band edge correlating the optical transmittance to wavelength at least across a wavelength range where the optical transmittance increases from about 10% to about 70% has a slope of about 2.36%/nm (with an r-squared of about 0.968) for Reflective Polarizer 12 and 0.626%/nm (with an r-squared of about 0.940) for Reflective Polarizer 13.

Figure 19:
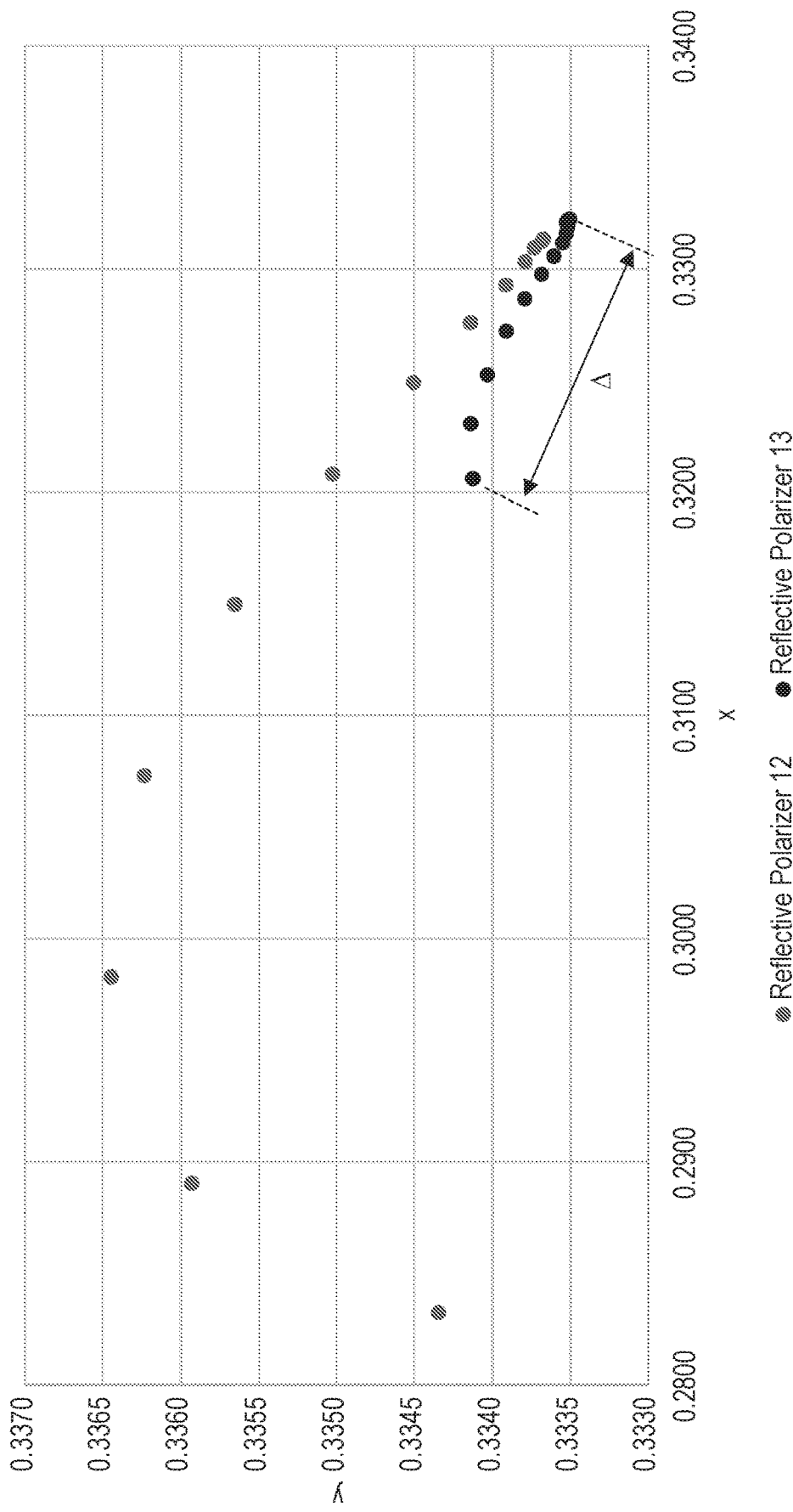
FIG. 19 is a plot in CIE 1931 x-y chromaticity coordinates of reflected color of substantially white incident light as a view angle varies from 0 to 60 degrees for the reflective polarizers of FIG. 17.

FIG. 19 is a plot on CIE 1931 x-y chromaticity coordinates of reflected color of substantially white incident light as view angle varies from 0 to 60 degrees for reflective polarizers 12 and 13. The maximum color shift (Euclidian distance in the x-y chromaticity plot) for Reflective Polarizer 12 was about 0.048, while the maximum color shift for Reflective Polarizer 13 was about 0.0116.

Mirror films can be made with similar layer thickness profiles as Reflective Polarizers 1-13. The mirror films would be expected to have transmission spectra for each of two orthogonal polarization states similar to the transmission spectra of the corresponding reflective polarizer for the block polarization state.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A optical film comprising a plurality of polymeric layers arranged along at least a portion of a thickness of the optical film, each polymeric layer having an average thickness less than about 300 nm, the plurality of polymeric layers comprising a first polymeric layer having a largest average thickness among the plurality of polymeric layers, and a second polymeric layer disposed between a third polymeric layer and the first polymeric layer, the first and second polymeric layers separated by N1 polymeric layers, 2≤N1≤10, the second and third polymeric layers separated by N2 polymeric layers, N2≥10, the first, second and third polymeric layers having respective average thicknesses t1, t2 and t3, t1 greater than t2 by at least 10%, t2 greater than t3 by at most 2%.

2. The optical film of claim 1, wherein for substantially normally incident light and a first wavelength range extending from about 400 nm to about 800 nm and a second wavelength range extending from about 950 nm to about 1300 nm, the plurality of polymeric layers:
   reflects greater than about 80% of the incident light having a first polarization state in the first wavelength range;
   transmits greater than about 40% of the incident light having a second polarization state, orthogonal to the first polarization state, in the first wavelength range; and
   transmits greater than about 70% of the incident light in the second wavelength range for each of the first and second polarization states.

3. The optical film of claim 2, wherein for the second polarization state and the first wavelength range, the optical film has a greater average optical transmittance for light incident at a smaller incident angle and a smaller average optical transmittance for light incident at a greater incident angle.

4. The optical film of claim 2, wherein for the substantially normally incident light and the first polarization state, an optical transmittance of the optical film comprises a band edge between about 850 nm and about 950 nm, such that a best linear fit to the band edge correlating the optical transmittance to wavelength at least across a wavelength range where the optical transmittance increases from about 10% to about 70% has a slope that is less than about 4%/nm.

5. The optical film of claim 2, wherein for the substantially normally incident light and the first polarization state, the optical film has an average optical transmission of no less than about 89.5% in a wavelength range from about 950 nm to about 1200 nm.

6. The optical film of claim 1, wherein for substantially normally incident light, the plurality of polymeric layers transmits greater than about 89.5% of the incident light in a wavelength range extending from about 950 nm to about 1300 nm for each of orthogonal first and second polarization states.

7. The optical film of claim 1, wherein the plurality of polymeric layers comprises first and second pluralities of polymeric layers, the first and second pluralities of polymeric layers separated from one another along the thickness of the optical film by at least one middle layer, each middle layer having an average thickness greater than about 500 nm.

8. The optical film of claim 1, wherein the plurality of polymeric layers are sequentially numbered from 1 to N, N an integer greater than about 100, an mth layer in the plurality of the polymeric layer having an average thickness tm, m<N, and wherein an average thickness of each polymeric layer in the plurality of polymeric layers having a layer number n, m≤n≤N, is within about 10% of:

$$tm + A\, e^{\frac{-(N-n)}{d}},$$

where A is a real number, 0.01 tm≤A≤0.25 tm, and d is an integer, 0.005N≤d≤0.1N.

9. The optical film of claim 1, wherein t1 is greater than t2 by at least 15% and each of the N2 layers has a substantially same average thickness.

10. A optical film comprising a plurality of polymeric layers arranged along at least a portion of a thickness of the optical film and sequentially numbered from 1 to N, N an integer between 50 and 800, each polymeric layer having an average thickness less than about 300 nm, a plot of an average layer thickness versus a layer number comprising a knee region separating a left region where the polymeric layers have lower layer numbers and the average thickness increases with increasing layer number at a smaller rate, from a right region where the polymeric layers have higher layer numbers and the average thickness increases with increasing layer number at a greater rate, such that the plurality of polymeric layers comprises a first polymeric layer in the right region having an average thickness t1', a second polymeric layer in the knee region having an average thickness t2', and a third polymeric layer in the left region having an average thickness t3', the first polymeric layer separated from the second polymeric layer by M1 polymeric layers, 2≤M1≤10, the third polymeric layer separated from the second polymeric layer by M2 polymeric layers, M2≥10, t1' greater than t2' by at least 10%, t2' greater than t3' by at most 2%.

11. The optical film of claim 10, wherein for substantially normally incident light and a first wavelength range extending from about 400 nm to at least about 600 nm, the plurality of polymeric layers:
   reflects greater than about 80% of the incident light having a first polarization state in the first wavelength range;
   transmits greater than about 40% of the incident light having a second polarization state, orthogonal to the first polarization state, in the first wavelength range.

12. The optical film of claim 11, wherein for the substantially normally incident light and the first polarization state, the optical film has an average optical transmission of no less than about 89.5% in a wavelength range from about 950 nm to about 1200 nm.

13. The optical film of claim 10, wherein for substantially normally incident light, the plurality of polymeric layers transmits greater than about 89.5% of the incident light in a wavelength range extending from about 950 nm to about 1300 nm for each of orthogonal first and second polarization states.

14. The optical film of claim 10, wherein for substantially normally incident light and a first wavelength range extending from about 400 nm to about 800 nm and a second wavelength range extending from about 950 nm to about 1300 nm, the plurality of polymeric layers:
   reflects greater than about 80% of the incident light having a first polarization state in the first wavelength range;
   transmits greater than about 40% of the incident light having a second polarization state, orthogonal to the first polarization state, in the first wavelength range; and
   transmits greater than about 70% of the incident light in the second wavelength range for each of the first and second polarization states.

15. The optical film of claim 10, wherein each of the M2 layers has a substantially same average thickness.

* * * * *